(12) United States Patent
Maruyama et al.

(10) Patent No.: US 12,196,639 B2
(45) Date of Patent: Jan. 14, 2025

(54) DETECTION METHOD OF STATE OF BEARING DEVICE, DETECTION DEVICE, AND PROGRAM

(71) Applicant: NSK LTD., Tokyo (JP)

(72) Inventors: Taisuke Maruyama, Fujisawa (JP); Suguru Sugawara, Fujisawa (JP); Masayuki Maeda, Fujisawa (JP)

(73) Assignee: NSK LTD., Tokyo (JP)

( * ) Notice: Subject to any disclaimer, the term of this patent is extended or adjusted under 35 U.S.C. 154(b) by 105 days.

(21) Appl. No.: 18/245,124

(22) PCT Filed: May 31, 2021

(86) PCT No.: PCT/JP2021/020755
§ 371 (c)(1),
(2) Date: Mar. 13, 2023

(87) PCT Pub. No.: WO2022/054352
PCT Pub. Date: Mar. 17, 2022

(65) Prior Publication Data
US 2023/0366781 A1    Nov. 16, 2023

(30) Foreign Application Priority Data
Sep. 14, 2020 (JP) ................. 2020-153845

(51) Int. Cl.
*F16C 19/52*  (2006.01)
*F16C 33/66*  (2006.01)
(Continued)

(52) U.S. Cl.
CPC ............. *G01M 13/04* (2013.01); *F16C 19/52* (2013.01); *F16C 33/6637* (2013.01);
(Continued)

(58) Field of Classification Search
CPC .... F16C 19/42; F16C 19/522; F16C 33/6637; F16C 33/6688; F16C 2233/00;
(Continued)

(56) References Cited

U.S. PATENT DOCUMENTS

2002/0083779 A1* 7/2002 Narita ................. G01M 13/045
73/862.191
2009/0016664 A1* 1/2009 Tsujimoto ............... F16C 33/36
384/576

(Continued)

FOREIGN PATENT DOCUMENTS

JP         5-3685 Y2   1/1993
JP     2008-185339 A   8/2008
(Continued)

OTHER PUBLICATIONS

Search Report (PCT/ISA/210) issued Jul. 13, 2021 by the International Searching Authority for International Application Patent No. PCT/JP2021/020755.
(Continued)

*Primary Examiner* — Phillip A Johnson
(74) *Attorney, Agent, or Firm* — Sughrue Mion, PLLC

(57) ABSTRACT

A detection method for detecting a state of a bearing device including an outer member, an inner member, and a plurality of rolling elements, the detection method including: applying an alternating current voltage to an electric circuit including the outer member, the rolling element, and the inner member while a predetermined load is applied to the bearing device; measuring an impedance and a phase angle of the electric circuit applied with the alternating current voltage; and deriving an oil film thickness and a metal contact ratio between the inner member and the plurality of
(Continued)

rolling elements or between the inner member and at least one of the plurality of rolling elements based on the impedance and the phase angle.

8 Claims, 23 Drawing Sheets

(51) Int. Cl.
    *G01B 7/06*     (2006.01)
    *G01M 13/04*     (2019.01)

(52) U.S. Cl.
    CPC ............ *F16C 33/6688* (2013.01); *G01B 7/06* (2013.01); *F16C 2233/00* (2013.01)

(58) Field of Classification Search
    CPC .... F16C 2240/60; F16B 2210/14; G01B 7/06; G01M 13/04; G01N 27/221; G01N 33/288; G01N 33/30
    See application file for complete search history.

(56) References Cited

U.S. PATENT DOCUMENTS

2013/0034439 A1* 2/2013 Bauer ................ F16C 33/6637
    416/1
2019/0128866 A1     5/2019 Maeda et al.

FOREIGN PATENT DOCUMENTS

| | | |
|---|---|---|
| JP | 4942496 B2 | 5/2012 |
| JP | 2018-180004 A | 11/2018 |
| JP | 2019-211317 A | 12/2019 |

OTHER PUBLICATIONS

Written Opinion (PCT/ISA/237) issued Jul. 13, 2021 by the International Searching Authority for International Application Patent No. PCT/JP2021/020755.

\* cited by examiner

DETECTION METHOD OF STATE OF BEARING DEVICE, DETECTION DEVICE, AND PROGRAM

CROSS REFERENCE TO RELATED APPLICATIONS

This application is a National Stage of International Application No. PCT/JP2021/020755 filed on May 31, 2021 claiming priority from Japanese Patent Application No. 2020-153845 filed on Sep. 14, 2020, the disclosures of which are incorporated herein in their entirety by reference.

TECHNICAL FIELD

The invention of the present application relates to a bearing device state detection method, detection device, and a program.

BACKGROUND ART

In the related art, in a bearing device, a configuration in which a lubricant (for example, lubricating oil or grease) is used to lubricate rotation of the bearing device is widely used. By periodically diagnosing a state of rotation parts such as bearing devices, damage and wear can be detected at an early stage, and failures or the like of the rotation parts can be prevented.

In a bearing device using a lubricant, in order to diagnose an operation state of the bearing device, a state of the lubricant is required to be appropriately detected. For example, Patent Literature 1 discloses a method in which a direct current low voltage is applied to a bearing, and a state of an oil film in the bearing from the measured voltage is diagnosed. Patent Literature 2 discloses a method in which modeling is performed regarding an oil film as a capacitor, an alternating current voltage is applied to a rotation ring of a bearing in a non-contact state, and a state of the oil film in the bearing device is estimated based on a measured electrostatic capacity.

CITATION LIST

Patent Literature

Patent Literature 1: JPH05-003685Y2
Patent Literature 2: JP4942496B

SUMMARY OF INVENTION

Technical Problem

In recent years, a demand for further reduction in torque in rolling bearings is present. In response to the reduction in torque, viscosity and amount of a lubricant used in rolling bearings have been reduced. Under such circumstances, a possibility that an oil film inside the rolling bearing breaks is present, and a contact ratio between parts will increase. Therefore, in addition to an oil film thickness, a contact state between parts inside the rolling bearing is required to be appropriately detected. In the method of Patent Literature 2, only the oil film thickness is measured, and it is difficult to grasp a metal contact ratio. In addition, since an electrostatic capacity outside a contact region is not considered, a measurement accuracy is not high. Furthermore, measurement has not been performed by paying attention to a load direction.

In view of the above problems, an object of the invention of the present application is to simultaneously detect an oil film thickness inside a bearing device and a metal contact ratio between parts in consideration of a load direction.

Solution To Problem

In order to solve the above problems, the invention of the present application has the following configuration. That is, a detection method for detecting a state of a bearing device including an outer member, an inner member, and a plurality of rolling elements, the detection method including:
applying an alternating current voltage to an electric circuit including the outer member, the rolling element, and the inner member while a predetermined load is applied to the bearing device;
measuring an impedance and a phase angle of the electric circuit when the alternating current voltage is applied; and
deriving an oil film thickness and a metal contact ratio between the outer member and the plurality of rolling elements or between the inner member and at least one of the plurality of rolling elements based on the impedance and the phase angle.

Another embodiment according to the invention of the present application has the following configuration. That is, a detection device for detecting a state of a bearing device including an outer member, an inner member, and a plurality of rolling elements, the detection device including:
an acquisition unit configured to, when an alternating current voltage is applied to an electric circuit including the outer member, the rolling element, and the inner member while a predetermined load is applied to the bearing device, acquire an impedance and a phase angle of the electric circuit applied with the alternating current voltage; and
a derivation unit configured to derive an oil film thickness and a metal contact ratio between the outer member and the plurality of rolling elements or between the inner member and at least one of the plurality of rolling elements based on the impedance and the phase angle.

Another embodiment according to the invention of the present application has the following configuration. That is, a non-transitory computer-readable storage medium storing a computer program for making a computer function as: an acquisition unit configured to, in a state of applying a predetermined load to a bearing device including an outer member, an inner member, and a plurality of rolling elements, when an alternating current voltage is applied to an electric circuit including the outer member, the rolling element, and the inner member, acquire an impedance and a phase angle of the electric circuit applied with the alternating current voltage; and a derivation unit configured to derive an oil film thickness and a metal contact ratio between the outer member and the plurality of rolling elements or between the inner member and at least one of the plurality of rolling elements based on the impedance and the phase angle.

Advantageous Effects of Invention

According to the invention of the present application, an oil film thickness inside a bearing device and a contact ratio between parts can be simultaneously detected in consideration of a load direction.

DESCRIPTION OF EMBODIMENTS

Figure 1:
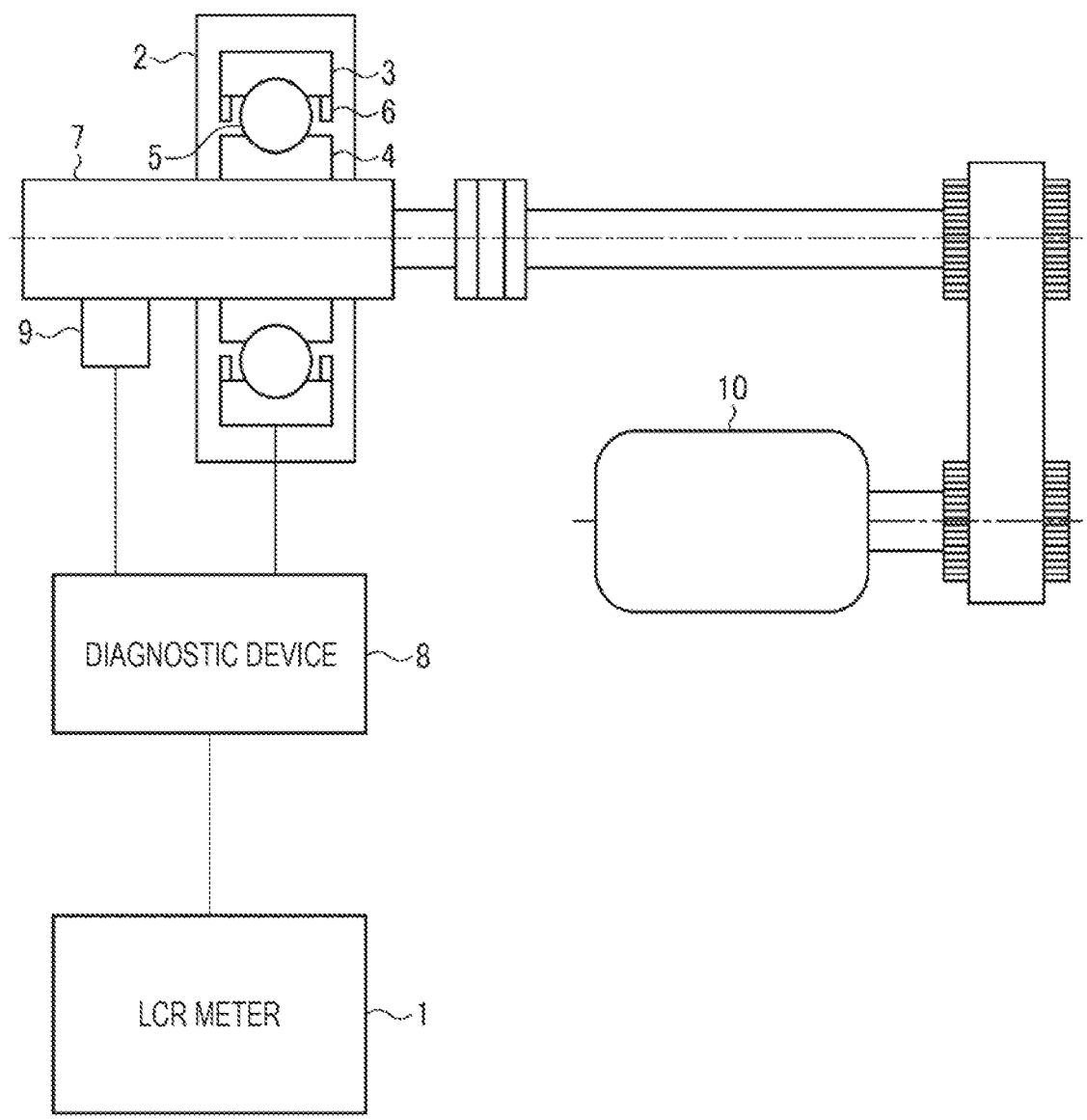
FIG. 1 is a schematic diagram showing an example of a configuration of a device during diagnosis according to a first embodiment of the invention of the present application.

Hereinafter, embodiments of the invention of the present application will be described with reference to the drawings. It should be noted that the embodiments described below are embodiments for illustrating the invention of the present application, and are not intended to be interpreted as limiting the invention of the present application, and all the configurations described in the respective embodiments are not necessarily essential configurations for solving the problem of the invention of the present application. In the drawings, the same components are denoted by the same reference numerals to indicate the correspondence.

First Embodiment

Hereinafter, a first embodiment of the invention of the present application will be described. In the following description, a ball bearing will be described as an example of a rolling bearing, but the invention of the present application is not limited thereto, and can be applied to rolling bearings having other configurations. For example, types of rolling bearings to which the invention of the present application can be applied include deep groove ball bearings, angular contact ball bearings, tapered roller bearings, cylindrical roller bearings, self-aligning roller bearings, and the like.

Configuration of Device

FIG. 1 is a schematic configuration diagram showing an example of an overall configuration when diagnosis is performed with a diagnostic device 1 according to the present embodiment. In FIG. 1, a bearing device 2 to which a diagnostic method according to the present embodiment is applied, and the diagnostic device 1 that performs diagnosis are provided. The configuration shown in FIG. 1 is an example, and a different configuration may be used according to a configuration of the bearing device 2 and the like. In FIG. 1, the bearing device has a shown configuration provided with one rolling bearing, but the bearing device 2 is not limited thereto, and a plurality of rolling bearings may be provided to one bearing device 2.

In the bearing device 2, the rolling bearing rotatably supports a rotary shaft 7. The rotary shaft 7 is supported by a housing (not shown) that covers an outside of the rotary shaft 7 via the rolling bearing which is a rotation part. The rolling bearing includes an outer ring (outer member) 3 which is a fixed ring fitted inside the housing, an inner ring (inner member) 4 which is a rotation ring fitted on the rotary shaft 7, a plurality of balls (rollers) which are a plurality of rolling elements 5 arranged between the inner ring 4 and the outer ring 3, and a retainer (not shown) that rotatably holds the rolling elements 5. Here, the outer ring 3 is fixed, but the inner ring 4 may be fixed and the outer ring 3 may rotate. A seal 6, which is a peripheral member, is provided to prevent dust from entering the vicinity of the rolling elements 5 and prevent a lubricant from leaking. Friction between the inner ring 4 and the rolling elements 5 and between the outer ring 3 and the rolling elements 5 is reduced by a predetermined lubrication method inside the rolling bearing. The lubrication method is not particularly limited, and for example, grease lubrication or oil lubrication is used, and lubrication is supplied to the inside of the rolling bearing. A type of the lubricant is also not particularly limited.

A motor 10 is a driving motor, and supplies power generated by rotation to the rotary shaft 7. The rotary shaft 7 is connected to an LCR meter 8 via a rotary connector 9. The rotary connector 9 may be configured using, for example, a carbon brush, but is not limited thereto. The bearing device 2 is also electrically connected to the LCR meter 8, and in this case, the LCR meter 8 also functions as an alternating current power source for the bearing device 2.

The diagnostic device 1 operates as a detection device capable of executing a detection method according to the present embodiment. The diagnostic device 1, when diagnosing, instructs the LCR meter 8 to input an alternating current voltage V and an angular frequency ω of the alternating current power source, and acquires a phase angle θ and an impedance |Z| (|Z| indicates an absolute value of Z) of the bearing device 2 from the LCR meter 8 in response to the input. The diagnostic device 1 uses these values to detect an oil film thickness and a metal contact ratio in the bearing device 2. Details of the detection method will be described later.

The diagnostic device 1 may be implemented by, for example, an information processing device including a control device, a storage device, and an output device (not shown). The control device may include a central processing unit (CPU), a micro processing unit (MPU), a digital single processor (DSP), a dedicated circuit, or the like. The storage device is implemented by volatile and non-volatile storage media such as a hard disk drive (HDD), a read only memory (ROM), and a random access memory (RAM), and can input and output various kinds of information according to instructions from the control device. The output device is implemented by a speaker, a light, a display device such as a liquid crystal display, or the like, and notifies an operator according to instructions from the control device. A notification method executed by the output device is not particularly limited, and for example, auditory notification performed by sound or visual notification performed by a screen output may be used. The output device may be a network interface having a communication function, and may perform a notification operation by transmitting data to an external device (not shown) via a network (not shown). A content of the notification here is not limited to a notification when an abnormality is detected, for example, when abnormality diagnosis is performed based on a detection result, and may include a notification that the bearing device 2 is normal.

Physical Model

Figure 2:
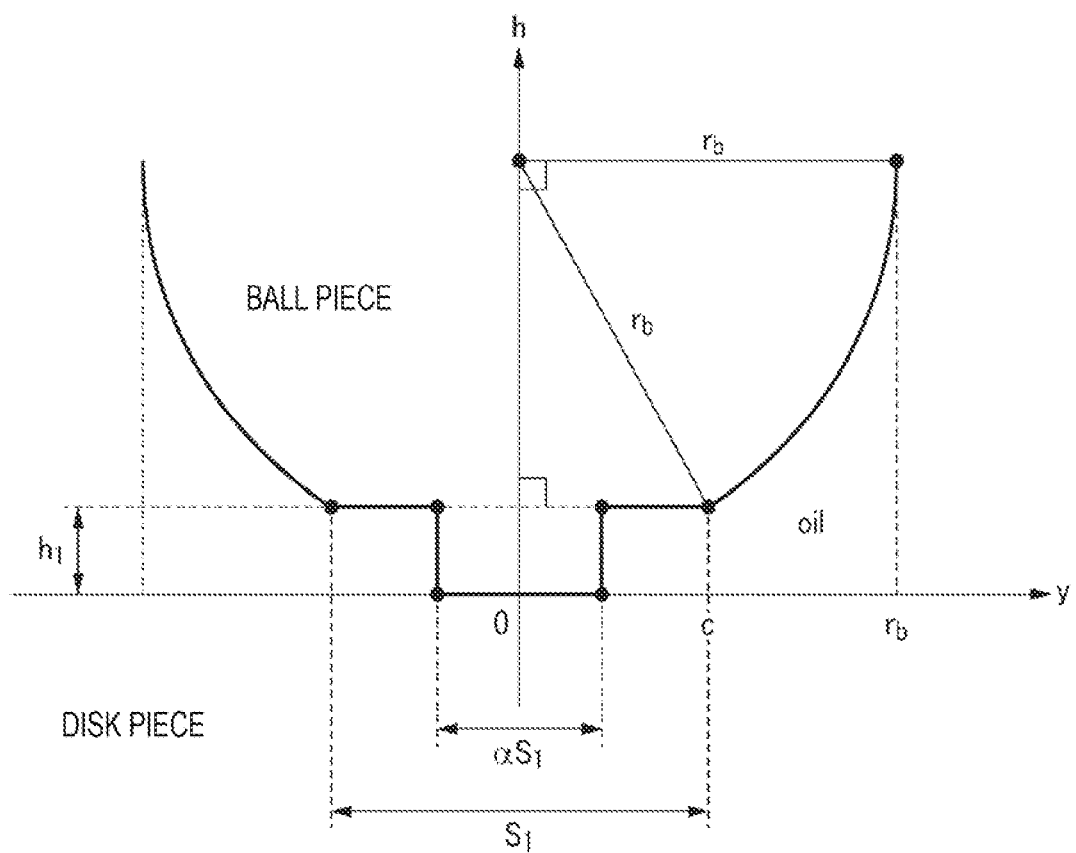
FIG. 2 is a graph showing a physical model of the bearing device according to the first embodiment of the invention of the present application.

A state of contact between the rolling elements 5 and the outer ring 3 (or the inner ring 4) in the bearing device 2 will be described with reference to FIG. 2. FIG. 2 is a graph showing a physical model when a ball piece and a disk piece come into contact with each other. The ball piece corresponds to the rolling element, and the disk piece corresponds to the outer ring 3 (or inner ring 4). An h-axis indicates an oil film thickness direction, and a y-axis indicates a direction orthogonal to the oil film thickness direction. Variables shown in FIG. 2 are as follows.

$S_1$: Hertzian contact area (Hertzian contact zone)
$c$: Hertzian contact radius $(=\sqrt{S_1/\pi})$
$\alpha$: breaking rate of oil film (metal contact ratio) $(0 \leq \alpha < 1)$
$r_b$: radius of ball piece
$\alpha S_1$: actual contact region (breaking region of oil film)
$h$: oil film thickness
$h_1$: oil film thickness in Hertzian contact zone In a Hertzian contact zone, $\alpha$: $(1-\alpha)$ indicates a ratio of an area where metal is in contact to an area where the metal is not in contact. In an ideal state where the ball piece and the disk piece are not in contact with each other, $\alpha=0$, and when $y=0$, $h>0$.

The oil film thickness h shown in FIG. 2 is represented by the following formula.

$$h = 0 \, (-\alpha S_1/2 \leq y \leq \alpha S_1/2)$$

$$h = h_1 \, (-c \leq y < -\alpha S_1/2 \text{ or } \alpha S_1/2 < y \leq c)$$

$$h = h_1 + \sqrt{(r_b^2 - c^2)} - \sqrt{(r_b^2 - y^2)} \, (-r_b \leq y < -c \text{ or } c < y \leq r_b) \quad (1)$$

In an actual rolling bearing, the rolling elements 5 are not strictly spherical since elastic deformation occurs when the rolling elements 5 receive a load, but in the present embodiment, the above Formula (1) is used assuming that an object is a sphere. Therefore, the formula used when obtaining the oil film thickness is not limited to Formula (1), and other calculation formulas may be used.

Figure 3:
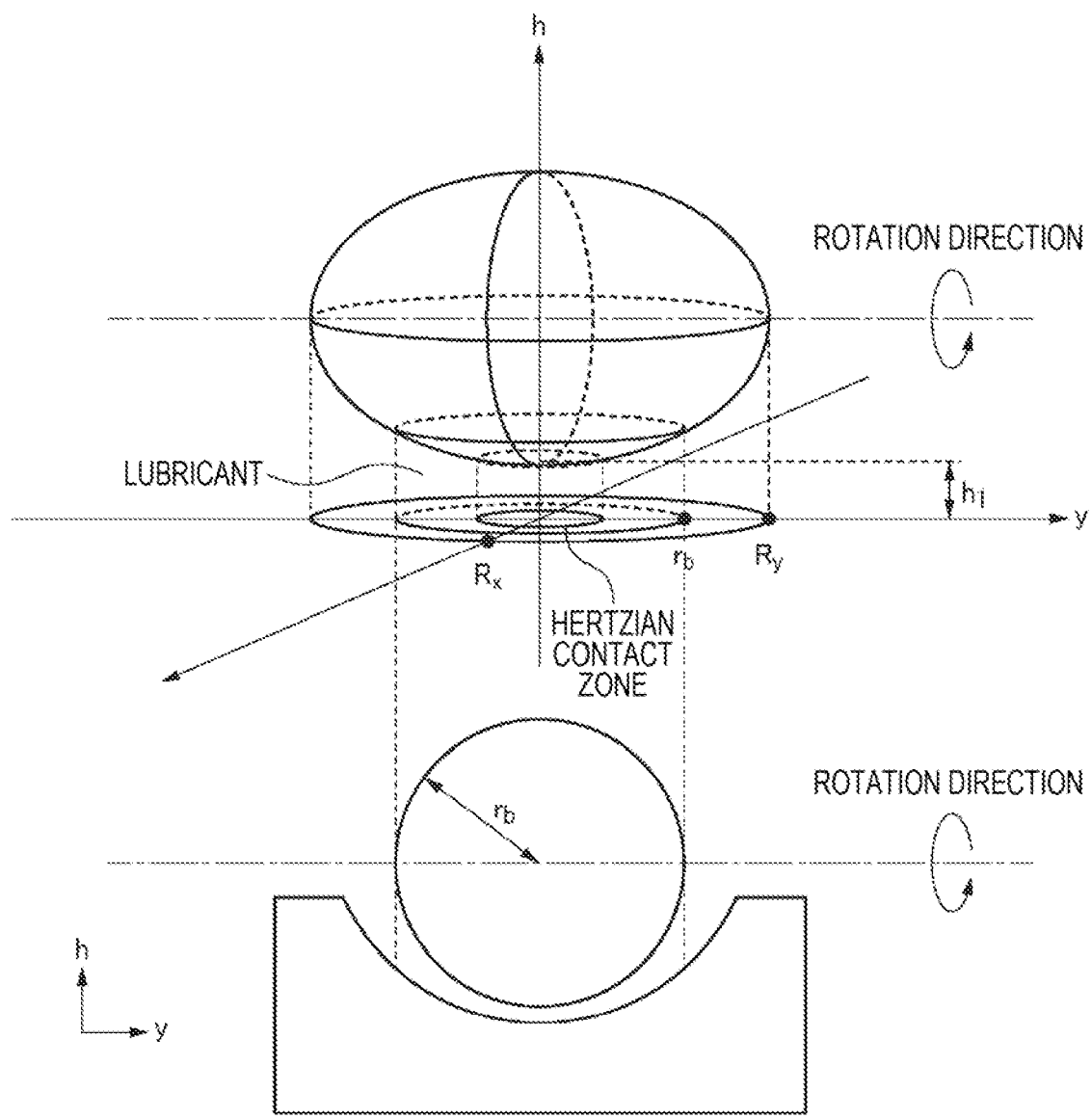
FIG. 3 is a graph showing a geometric model according to the first embodiment of the invention of the present application.

FIG. 3 is a diagram showing a geometric model in the rolling bearing. An x-axis indicates an axial direction orthogonal to the y-axis and the h-axis. Variables shown in FIG. 3 are as follows. The same symbols as those in FIG. 2 correspond.

$R_x$: effective radius (x-axis)
$R_y$: effective radius (y-axis)
$h_1$: oil film thickness in Hertzian contact zone
$r_b$: radius of ball piece As shown in FIG. 3, it is assumed that the rolling element 5 rotates about the y-axis and the load (radial load) is applied in the h-axis direction.

Equivalent Electric Circuit

Figure 4:
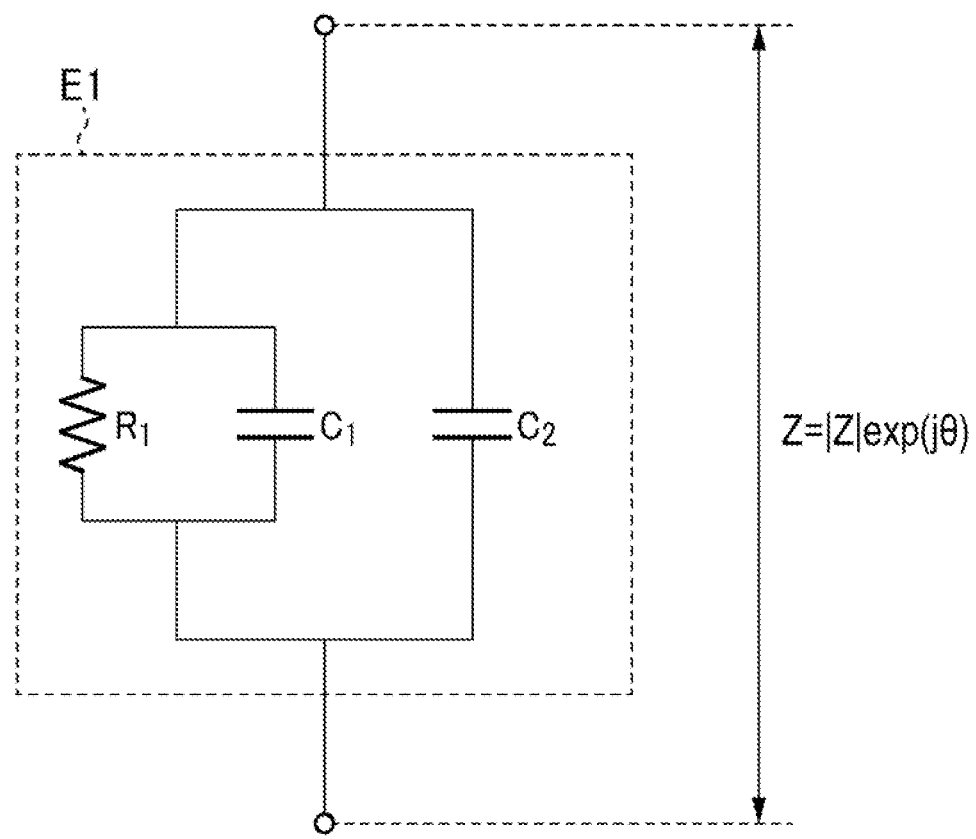
FIG. 4 is a circuit diagram for illustrating an equivalent circuit of the bearing device according to the first embodiment of the invention of the present application.

FIG. 4 is a diagram showing an electrically equivalent electric circuit (equivalent circuit) of the physical model shown in FIG. 2. An equivalent circuit E1 includes a resistor $R_1$, a capacitor $C_1$, and a capacitor $C_2$. The resistor $R_1$ corresponds to a resistor in the breaking region $(=\alpha S_1)$. The capacitor $C_1$ corresponds to a capacitor formed by the oil film in the Hertzian contact zone and is set as an electrostatic capacity $C_1$. The capacitor $C_2$ corresponds to a capacitor formed by the oil film around the Hertzian contact zone $(-r_b \leq y < -c$ and $c < y \leq r_b$ in FIG. 2) and is set as an electrostatic capacity $C_2$. The Hertzian contact zone $(=S_1)$ forms a parallel circuit of the resistor $R_1$ and the capacitor $C_1$ in the equivalent circuit E1 of FIG. 4. Furthermore, the capacitor $C_2$ is connected in parallel with the electric circuit including the resistor $R_1$ and the capacitor $C_1$. In this case, it is assumed that the periphery of the Hertzian contact zone $(-r_b \leq y < -c$ and $c < y \leq r_b$ in FIG. 2) is filled with a lubricant.

An impedance of the equivalent circuit E1 is indicated by Z. Here, the alternating current voltage V applied to the equivalent circuit E1, a current I flowing through the equivalent circuit E1, and the complex impedance Z of the entire equivalent circuit E1 are expressed by the following Formulas (2) to (4).

$$V = |V| \exp(j\omega t) \quad (2)$$

$$I = |I| \exp(j\omega t) \quad (3)$$

$$Z = V/I = |V/I| \exp(j\theta) = \exp(j\theta) \quad (4)$$

j: imaginary number
ω: angular frequency of alternating current voltage
t: time
θ: phase angle (phase shift between voltage and current)

Figure 5:
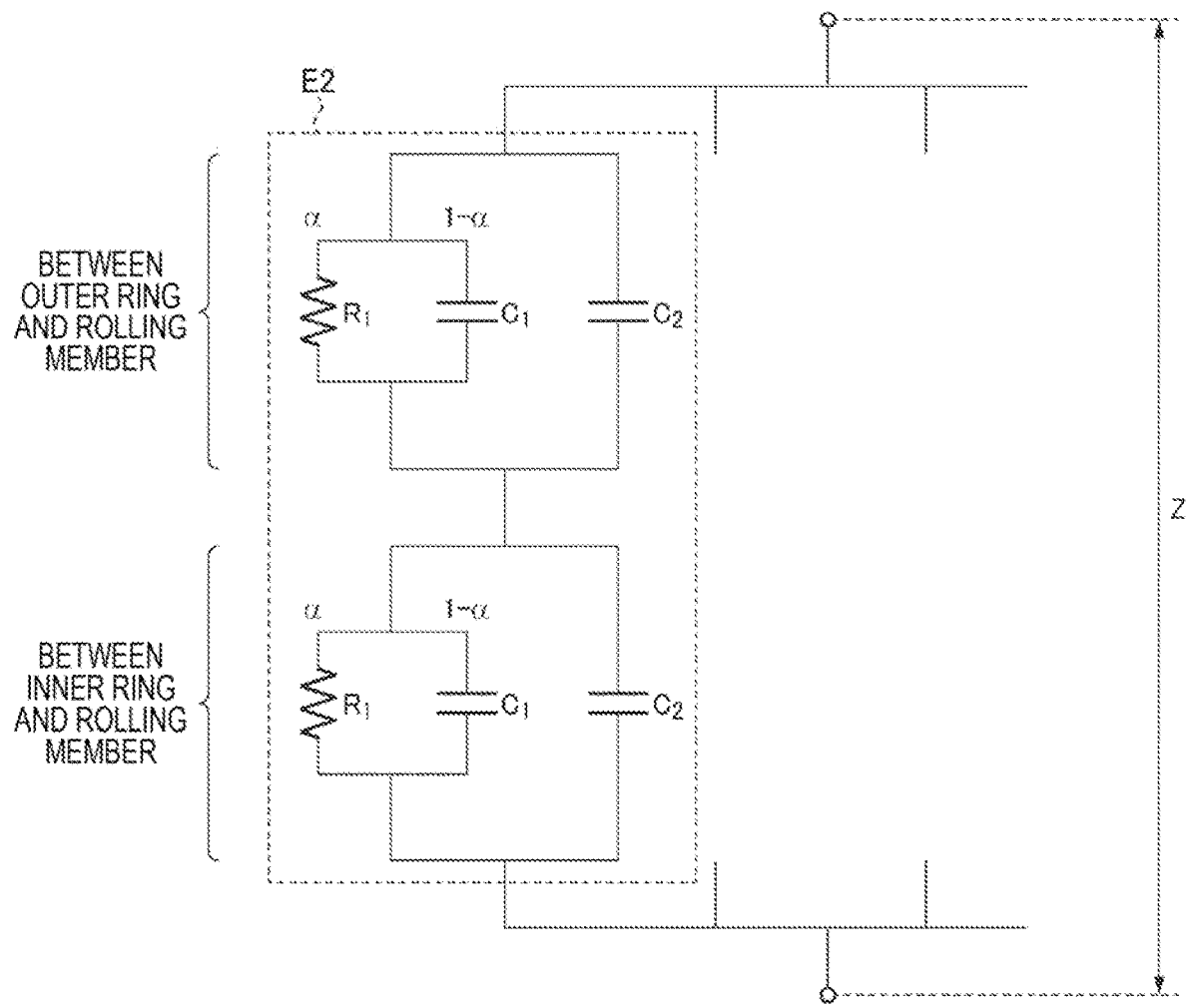
FIG. 5 is a circuit diagram for illustrating an equivalent circuit of the bearing device according to the first embodiment of the invention of the present application.

FIG. 5 is a diagram showing an electrically equivalent electric circuit around one rolling element 5 based on the equivalent circuit E1 shown in FIG. 4. Focusing on the one rolling element 5, an equivalent circuit E2 is formed between the outer ring 3 and the rolling element 5 and between the inner ring 4 and the rolling element 5. Here, an upper side is assumed to be an electric circuit formed by the outer ring 3 and the rolling element 5, and a lower side is assumed to be an electric circuit formed by the inner ring 4 and the rolling element 5, and the reverse is also possible. Around one rolling element 5, the electric circuits are connected in series to form the equivalent circuit E2.

Electrostatic Capacity Generated by Radial Load

Figure 6:
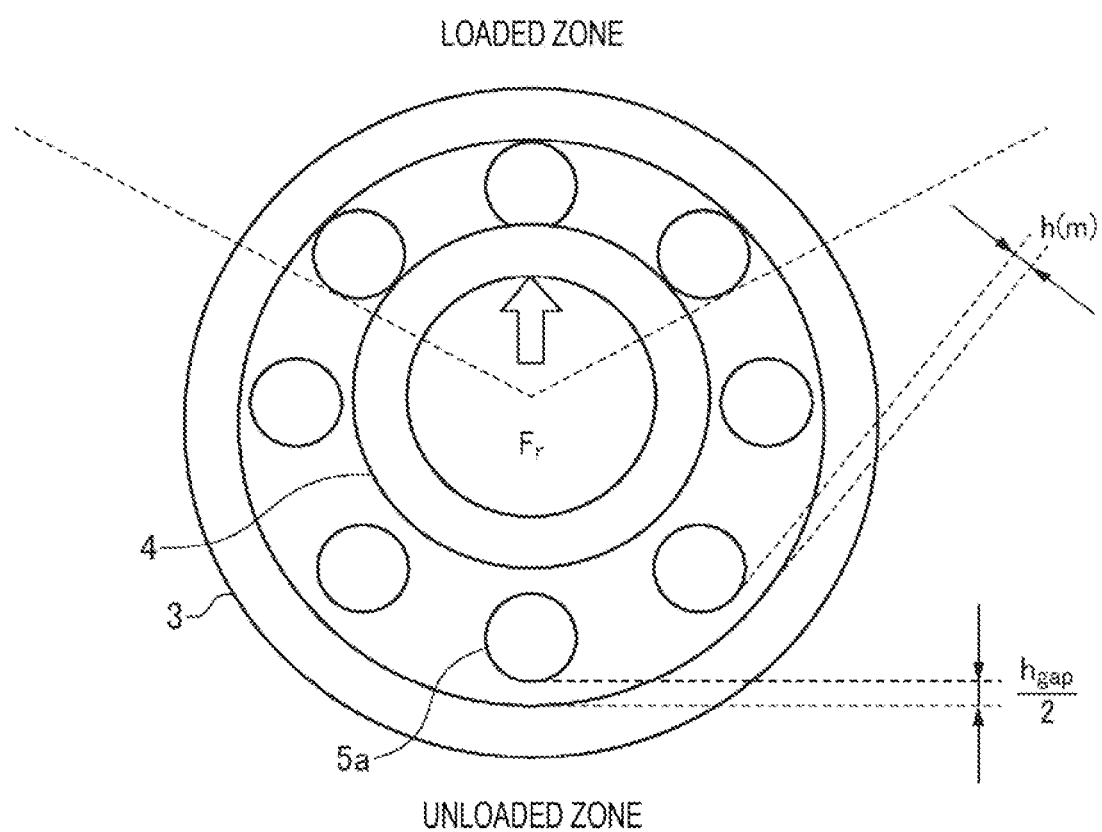
FIG. 6 is a diagram for illustrating a loaded zone and an unloaded zone according to the first embodiment of the invention of the present application.

FIG. 6 is a diagram for illustrating a loaded zone and an unloaded zone when the radial load is applied to the rolling bearing. Here, it is assumed that a radial load $F_r$ is applied via the rotary shaft 7 to the rolling bearing. In this case, in the plurality of rolling elements 5, a range where the Hertzian contact zone as shown in FIG. 2 is generated is referred to as the loaded zone, and the other range is referred to as the unloaded zone. The range of the loaded zone can vary depending on a magnitude of the radial load, the configuration of the rolling bearing, and the like.

Figure 7A:
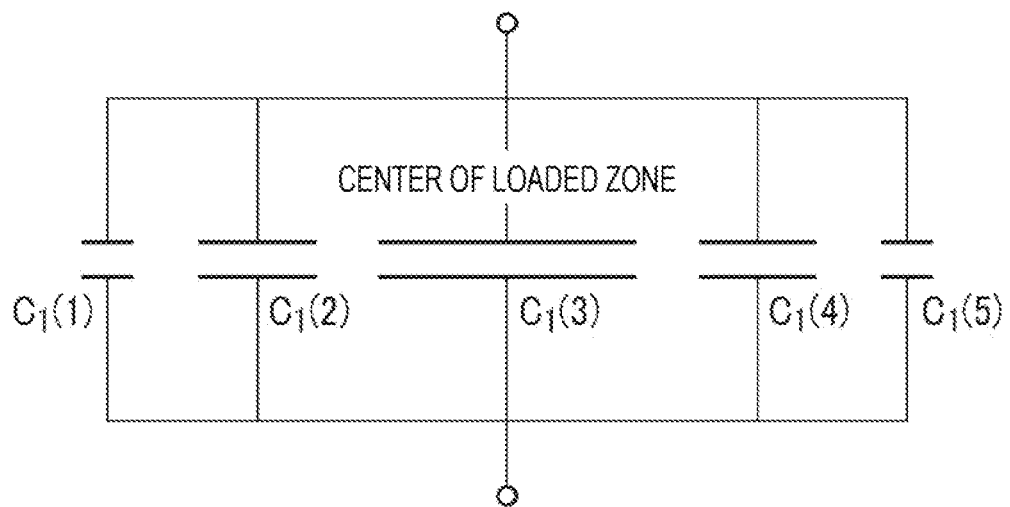
FIG. 7A is a diagram for illustrating an electrostatic capacity of the loaded zone according to the first embodiment of the invention of the present application.
Figure 7B:
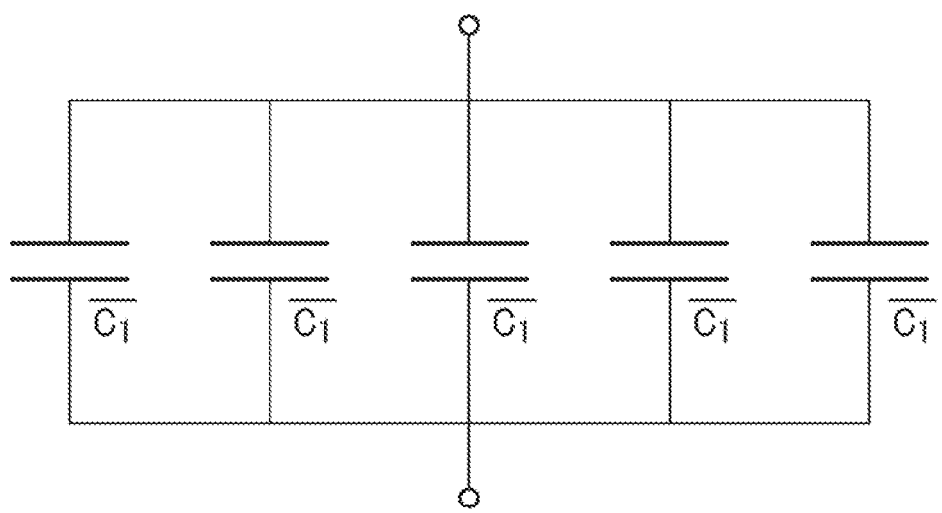
FIG. 7B is a diagram for illustrating an electrostatic capacity of the loaded zone according to the first embodiment of the invention of the present application.

First, an electrostatic capacity of the capacitor $C_1$ in the loaded zone will be described. FIGS. 7A and 7B are diagrams for illustrating a concept of the capacitor $C_1$ formed by the rolling elements 5 positioned in the loaded zone. Here, an example in which five rolling elements are included in the loaded zone and capacitors $C_1(1)$ to $C_1(5)$ are formed by the respective rolling elements will be described. In the loaded zone, a size of the Hertzian contact zone varies depending on positions of the rolling elements. In this case, as shown in FIG. 7A, it is also assumed that the electrostatic capacity becomes smaller as a distance from the center of the loaded zone increases.

However, as shown in FIG. 2 or FIG. 3, an oil film thickness $h_1$ in the Hertzian contact zone is assumed to be hardly affected by the radial load, and in the present embodiment, it is assumed that the oil film thickness within the loaded zone is constant. Based on this, as shown in FIG. 7B, a Hertzian contact area $S_1$ is averaged, and the electrostatic capacity of the capacitor $C_1$ formed by each of the plurality of rolling elements 5 within the loaded zone is treated as uniform. Therefore, the electrostatic capacities of the capacitor $C_1$ formed by the plurality of rolling elements 5 positioned in the loaded zone can be derived from the following Formula (5).

[Equation 1]

$$\sum_{m=1}^{n_1} C_1(m) = n_1 \overline{C_1} \quad (5)$$

m: natural number indicating rolling elements positioned in loaded zone ($1 \leq m \leq n_1$)
$n_1$: number of rolling elements positioned in loaded zone
$C_1(m)$: electrostatic capacity in Hertzian contact zone of m rolling element
$\overline{C_1}$: average value of $C_1(m)$ Next, an electrostatic capacity of a capacitor $C_3$ in the unloaded zone will be described. In the unloaded zone, a gap between the rolling element 5 and the outer ring 3 and a gap between the rolling element 5 and the inner ring 4 are generated. As shown in FIG. 6, among the rolling elements 5 positioned in the unloaded zone, when a radial gap $h_{gap}$ includes a gap between a central rolling element 5a and the outer ring 3 and a gap between the rolling element 5a and the inner ring 4, a gap between each of the plurality of rolling elements 5 positioned in the unloaded zone and the outer ring 3 can be derived from the following Formula (6). It is assumed that the gap between the rolling element 5a and the outer ring 3 and the gap between the rolling element 5a and the inner ring 4 are the same ($h_{gap}/2$). The radial gap $h_{gap}$ can be derived from the radial load $F_r$, specifications of the rolling bearing, and the like.

[Equation 2]

$$h(m) = \frac{h_{gap}}{2}\left(1 - \cos\left(\frac{2\pi m}{n - n_1 + 1}\right)\right) \quad (6)$$

m: natural number indicating rolling elements positioned in unloaded zone ($1 \leq m \leq (n-n_1)$)
n: total number of rolling elements
$n_1$: number of rolling elements positioned in loaded zone Then, based on Formula (6), an electrostatic capacity $C_3$ of the entire unloaded zone can be derived from Formula (7) below.

Figure 8:
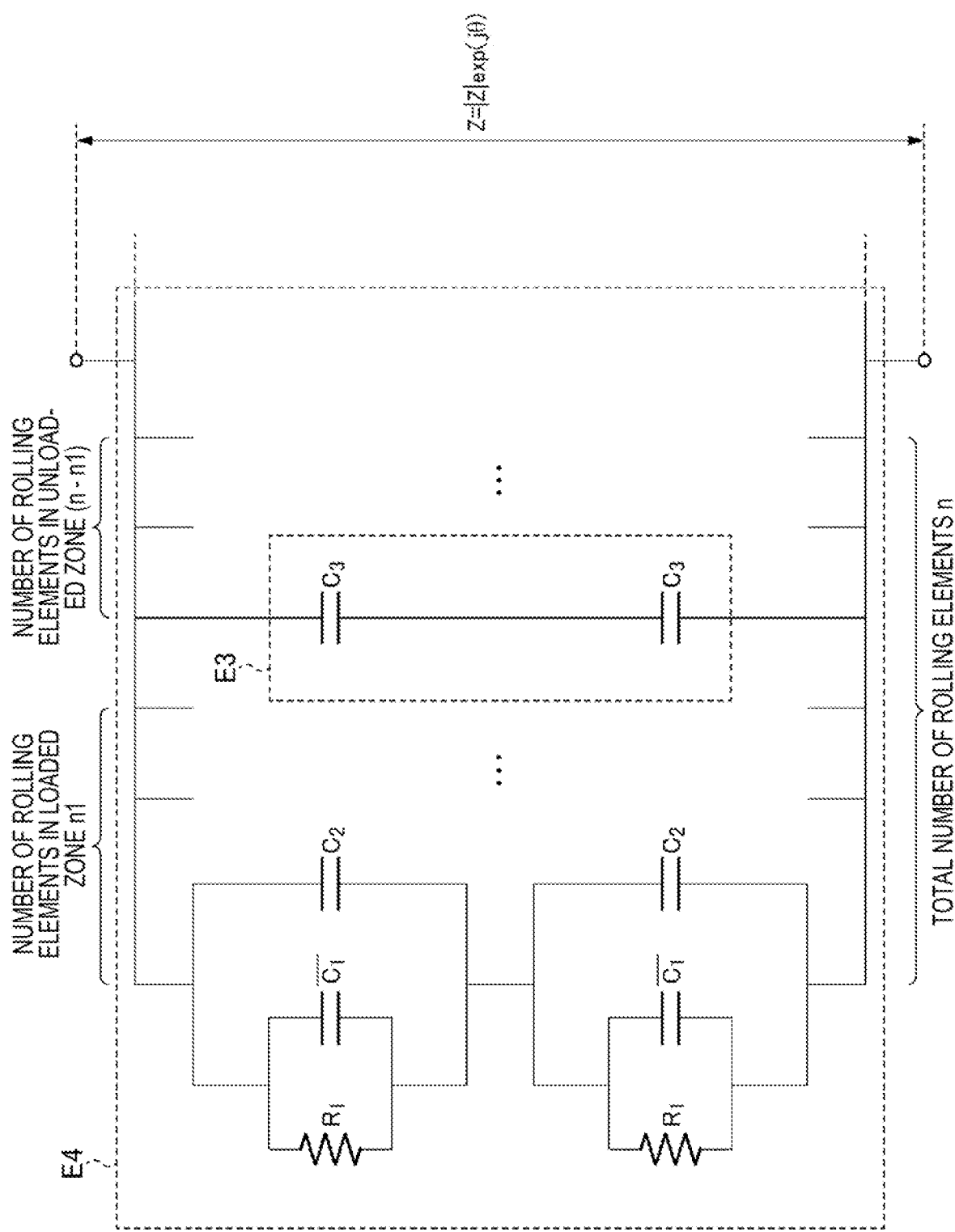
FIG. 8 is a circuit diagram for illustrating an equivalent circuit according to the first embodiment of the invention of the present application.

[Equation 3]

$$\sum_{m=1}^{n-n_1} C_3(m) = \sum_{m=1}^{n-n_1} \frac{\varepsilon S_1}{h(m)} = \frac{2\pi\varepsilon \overline{r_x r_y}}{\overline{r_h}} \ln \frac{\left(8\overline{r_h}/h_{gap}\right)^{n-n_1}}{(n-n_1+1)^2} \quad (7)$$

m: natural number indicating rolling elements positioned in unloaded zone ($1 \leq m \leq (n-n_1)$)
n: total number of rolling elements
$n_1$: number of rolling elements positioned in loaded zone
ε: dielectric constant of lubricant
$C_3(m)$: electrostatic capacity in Hertzian contact zone of m rolling elements
$S_1$: Hertzian contact area
π: Pi
$\overline{r_x}$: average value of effective radius (x-axis)
$\overline{r_y}$: average value of effective radius (y-axis)
$\overline{r_h}$: constant ($=(\overline{r_x}+\overline{r_y})/2$)
$h_{gap}$: radial gap
ln: logarithmic function FIG. 8 is a diagram showing an electrically equivalent circuit of the entire bearing device 2 in consideration of the capacitors formed in the above-described loaded zone and unloaded zone. The $n_1$ equivalent circuits E2 are connected in parallel corresponding to the n rolling elements 5 positioned in the loaded zone. In this case, as described with reference to FIGS. 7, $\overline{C_1}$ is used as the electrostatic capacity in the Hertzian contact zone.

$(n-n_1)$ equivalent circuits E3 are connected in parallel corresponding to the $(n-n_1)$ rolling elements 5 positioned in the unloaded zone. Similar to the loaded zone, the capacitors are formed between the outer ring 3 and the rolling element 5 and between the inner ring 4 and the rolling element 5, respectively, and thus the equivalent circuit E3 has a configuration in which two capacitors $C_3$ are connected in series. Here, an upper side is assumed to be an electric circuit formed by the outer ring 3 and the rolling element 5, and a lower side is assumed to be an electric circuit formed by the inner ring 4 and the rolling element 5, and the reverse is also possible. At the time of diagnosis, the alternating current power source is supplied from the LCR meter 8 to an equivalent circuit E4 constituted by the entire bearing device 2 shown in FIG. 8.

Figure 9:
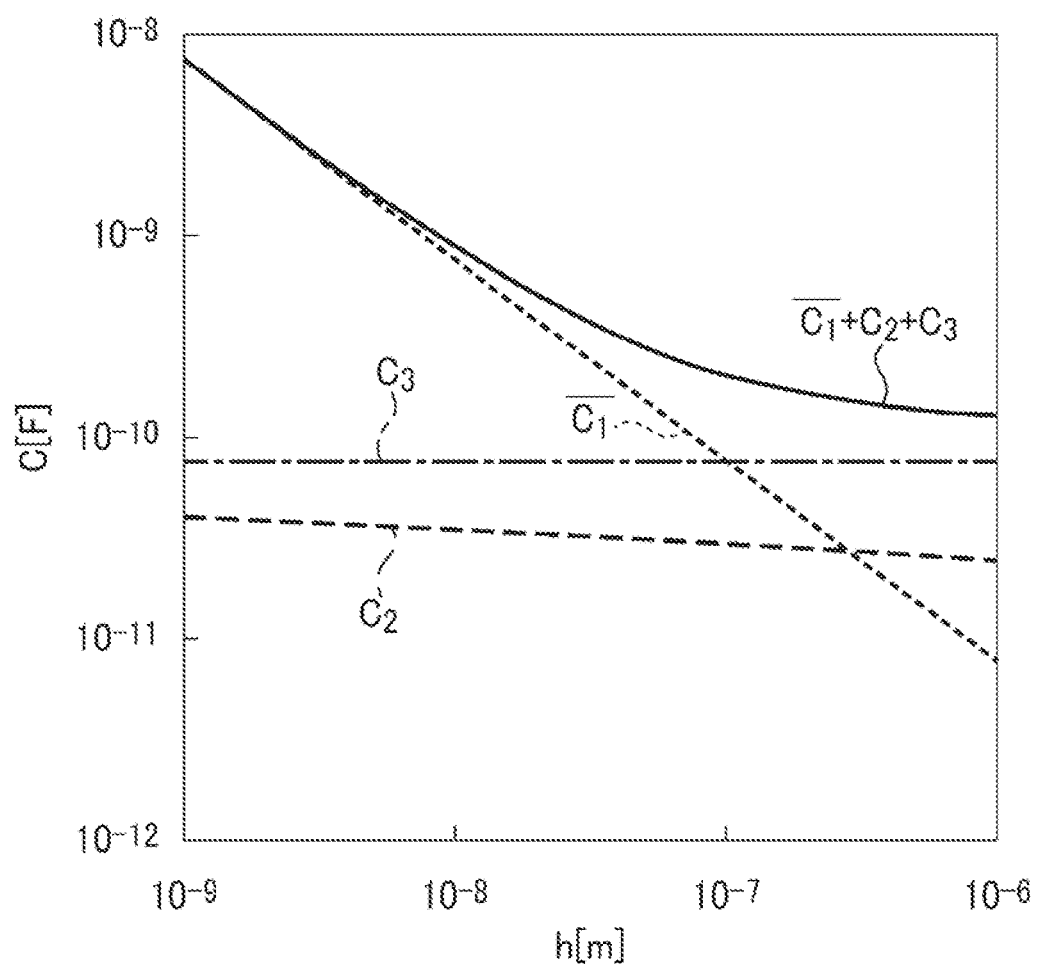
FIG. 9 is a graph for illustrating the electrostatic capacities according to the first embodiment of the invention of the present application.

FIG. 9 is a diagram showing an example of relations between the oil film thickness h and the electrostatic capacities C of the capacitors $C_1{}^-$, $C_2$, and $C_3$ included in the electric circuits shown in FIG. 8. A horizontal axis indicates the oil film thickness h [m], and a vertical axis indicates the electrostatic capacity C [F]. In addition, FIG. 9 shows the relations under the following conditions.

Bearing: deep groove ball bearing (model No. 6306)
Number of rolling elements (n): 8
Number of rolling elements positioned in loaded zone ($n_1$): 3
Radial load ($F_r$)=147 [N]

As shown in FIG. 9, electrostatic capacities of the capacitor $C_1{}^-$ and $C_2$ decrease (monotonic decrease) as the oil film thickness h increases. A slope of the capacitor $C_1{}^-$ is greater than that of $C_2$. $C_3$ is constant regardless of the oil film thickness h. In a combination of the capacitors $C_1{}^-$, $C_2$, and $C_3 (=C_1{}^- + C_2 + C_3)$, an electrostatic capacity decreases as the oil film thickness h increases, but a degree of change becomes gentle as the oil film thickness h increases.

Derivation of Oil Film Thickness and Breaking Rate of Oil Film

In the present embodiment, a lubrication state is detected using the oil film thickness h and the breaking rate α of the oil film of the lubricant under the radial load as described above. First, the oil film thickness h and the breaking rate α of the oil film of the lubricant under the axial load can be derived using the following Formula (8).

[Equation 4]

$$h = (1-\alpha)\delta/\mathfrak{W}\left(\left(\frac{\delta}{\overline{r_h}}\right)\exp\left(1-\zeta\frac{\sin\theta}{\omega|Z|}\right)\right) \quad (8)$$

$$\alpha = |Z_0|\cos\theta/|Z|\cos\theta_0$$

h: oil film thickness
α: breaking rate of oil film (metal contact ratio)
δ: constant $(=(1-\alpha)\overline{r_h}{}^- S_1/2\pi\overline{r_x}{}^-\overline{r_y}{}^-)$
ω: angular frequency of alternating current voltage
W: Lambert W function
ζ constant $(=1-\overline{r_h}{}^- S_1/2\pi\overline{r_x}{}^-\overline{r_y}{}^-)$
$\theta_0$: phase in static contact state
θ: phase in dynamic contact state
$|Z_0|$: impedance in static contact state
$|Z_0|$: impedance in dynamic contact state
$\overline{r_x}{}^-$: average value of effective radius (x-axis)
$\overline{r_y}{}^-$: average value of effective radius (y-axis)
$\overline{r_h}{}^-$: constant $(=(\overline{r_x}{}^- + \overline{r_y}{}^-)/2)$
k: number of rolling bearings
l: number of contact regions
m: natural number indicating rolling elements positioned in unloaded zone $(1 \le m \le (n-n_1))$
n: total number of rolling elements
$n_1$: number of rolling elements positioned in loaded zone $C_3(m)$: electrostatic capacity in Hertzian contact zone having m rolling element Formula (8) is a formula constructed based on the equivalent circuit E2 described with reference to FIG. 5. That is, Formula (8) takes into account effects of the capacitors $C_1{}^-$ and $C_2$. In the present embodiment, in order to derive the oil film thickness h and the breaking rate α of the oil film of the lubricant under the radial load, the following Formula (9), which is a combination of Formula (8) and Formulas (5) to (7), is used.

[Equation 5]

$$h = (1-\alpha)\delta/\mathfrak{W}\left(\left(\frac{\delta}{\overline{r_h}}\right)\exp\left(1-\zeta\left(\frac{\sin\theta}{\omega|Z|} + \frac{k}{l}\sum_{m=1}^{n-n_1} C_3(m)\right)\right)\right) \quad (9)$$

$$\alpha = |Z_0|\cos\theta/|Z|\cos\theta_0$$

$C_3(m)$: electrostatic capacity in Hertzian contact zone having (m) rolling element

Processing Flow

Figure 10:
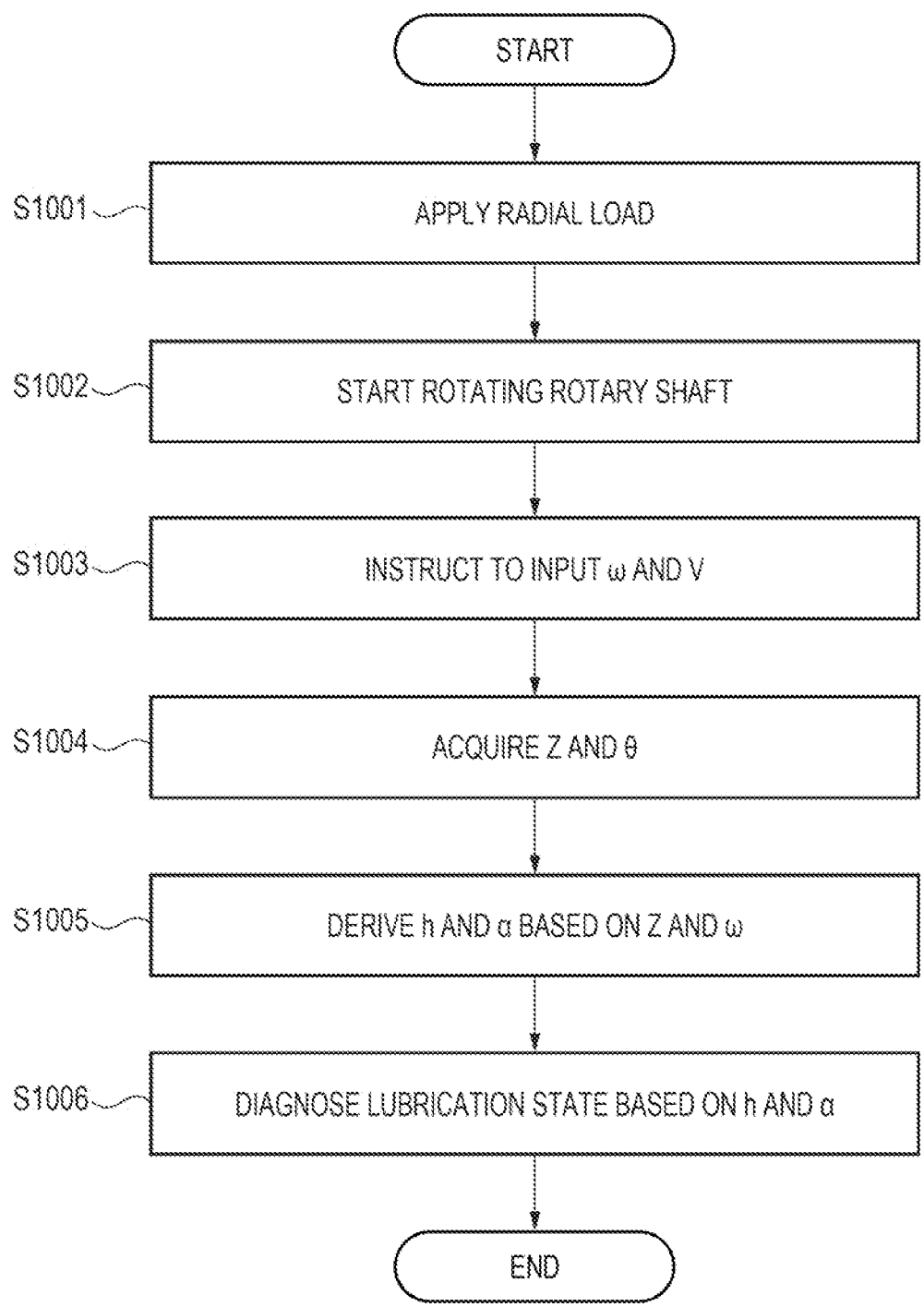
FIG. 10 is a flowchart of processing during measurement according to the first embodiment of the invention of the present application.

FIG. 10 is a flowchart of diagnostic processing according to the present embodiment. The processing is executed by the diagnostic device 1, and may be implemented, for example, by reading and executing a computer program for implementing the processing according to the present embodiment from a storage device (not shown) by a control device (not shown) included in the diagnostic device 1.

In S1001, the diagnostic device 1 controls to apply the radial load $F_r$ to the bearing device 2 in a predetermined load direction. Here, the radial load $F_r$ is applied to the inner ring 4. The control of applying the radial load $F_r$ may be performed by a device other than the diagnostic device 1. In this case, the phase and the impedance in a static contact state are measured.

In S1002, the diagnostic device 1 causes the motor 10 to start rotating the rotary shaft 7. Accordingly, rotation of the inner ring 4 connected to the rotary shaft 7 is started. The control over the motor 10 may be performed by a device other than the diagnostic device 1.

In S1003, the diagnostic device 1 controls the LCR meter 8 to apply the alternating current voltage with angular frequency ω to the bearing device 2 by using an alternating current power source (not shown) provided in the LCR meter 8. Accordingly, the alternating current voltage with angular frequency ω is applied to the bearing device 2.

In S1004, the diagnostic device 1 acquires the impedance |Z| and the phase angle θ from the LCR meter 8 as outputs in response to the input at S1003. That is, the LCR meter 8 outputs the impedance |Z| and the phase angle θ to the diagnostic device 1 as detection results of the bearing device 2 with respect to the input alternating current voltage V and the input angular frequency ω of the alternating current voltage.

In S1005, the diagnostic device 1 applies the impedance |Z| and the phase angle θ acquired in S1004 and the angular frequency ω of the alternating current voltage used in S1003 to Formula (9) to derive the oil film thickness h and the breaking rate α.

In S1006, the diagnostic device 1 diagnoses the lubrication state of the bearing device 2 by using the oil film thickness h and the breaking rate α derived in S1005. In the diagnostic method here, for example, thresholds may be set for the oil film thickness h and the breaking rate α, and the lubrication state may be determined by comparison with the thresholds. Then, the processing flow is ended.

Test

Results of tests conducted based on the diagnostic method described above will be described. The configuration at the time of testing is the same as the configuration shown in FIG. 1, and test conditions are as follows.

Test Condition

Bearing: deep groove ball bearing (model No. 6306)
Number of rolling elements (n): 8
Rotational speed: 50 [min$^{-1}$] to 1581 [min$^{-1}$]
Axial load: 0 [N]
Radial load ($F_r$)=147 [N]
Temperature: 25[° C.]
Maximum contact pressure: 0.89 [GPa]
Base oil of lubricant: polyalphaolefin
Thickener of lubricant: urea
Worked penetration: 300
Kinematic viscosity: 74 [mm$^2$/s, 40° C.]
Pressure viscosity coefficient: 13.8 [GPa$^{-1}$, 25° C.]
Relative dielectric constant: 2.3
Alternating current voltage: 0.2 [V]
Frequency of alternating current power source: 1.0 [MHz]

Figure 11A:
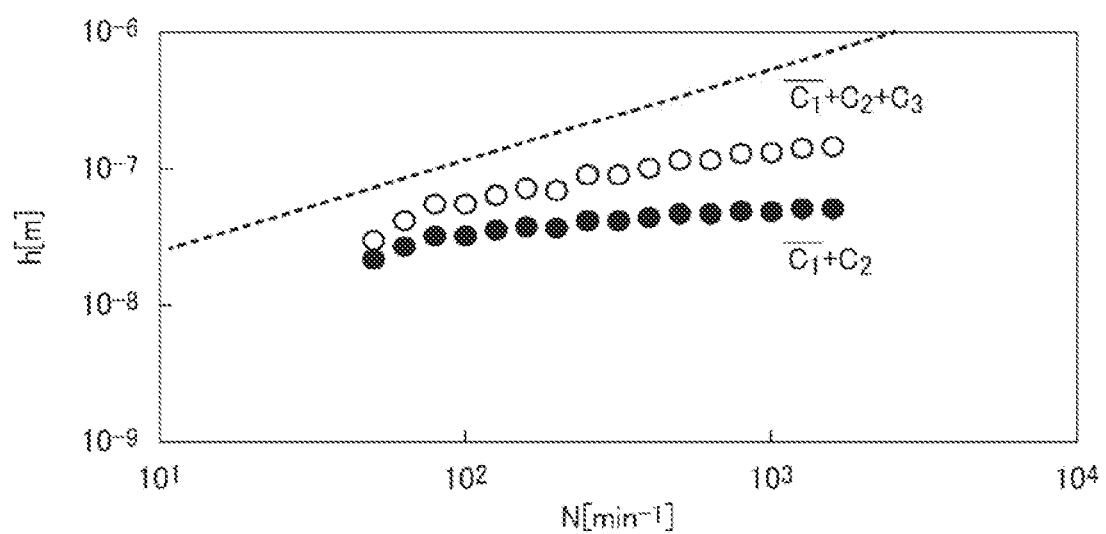
FIG. 11A is a graph showing a measurement result according to the first embodiment of the invention of the present application.
Figure 11B:
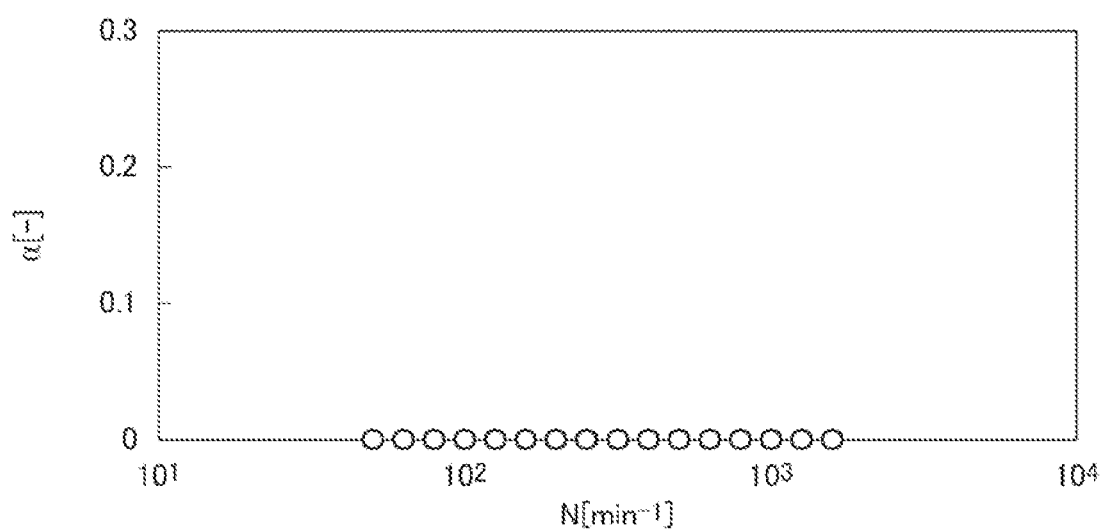
FIG. 11B is a graph showing a measurement result according to the first embodiment of the invention of the present application.

FIGS. 11A and 11B are diagrams showing a relation between a rotational speed N and the oil film thickness h and a relation between the rotational speed N and the breaking rate α which are obtained from the results of the test conducted under the above test conditions. In FIG. 11A, a horizontal axis indicates the rotational speed N [min$^{-1}$], and a vertical axis indicates the oil film thickness h [m]. In FIG. 11B, a horizontal axis indicates the rotational speed N [min$^{-1}$], and a vertical axis indicates the breaking rate α. As shown in the test conditions described above, the results are plotted for the rotational speed in the range of 50 [min$^{-1}$] to 1581 [min$^{-1}$].

A dashed line in FIG. 11A indicates the oil film thickness derived as a theoretical value. "●" indicates a result of deriving the oil film thickness h by using Formula (8). "○" indicates a result of deriving the oil film thickness h by using Formula (9). That is, "○" is a derivation result in consideration of the capacitor $C_3$ configured in the unloaded zone under the radial load. As shown in FIG. 11A, the result indicated by "○" is closer to the theoretical value than the result indicated by "●" at any rotational speed, making it possible to derive the oil film thickness h with higher accuracy. As shown in FIG. 11B, the breaking rate α can be derived in combination with the oil film thickness h at any rotational speed.

As described above, according to the present embodiment, an oil film thickness inside a bearing device and a contact ratio between parts can be simultaneously detected in consideration of a radial load.

Formula (9) used in the present embodiment is constructed based on Formula (8) in consideration of the axial load, and thus Formula (9) is applicable even under the axial load. Therefore, Formula (9) can be used universally under both axial load and radial load conditions.

Second Embodiment

In the first embodiment, a configuration has been described in which the oil film thickness inside the bearing device and the contact ratio between parts are simultaneously detected in consideration of the configuration of the unloaded zone of the bearing device 2 under the radial load. In a second embodiment of the invention of the present application, a configuration for further improving a measurement accuracy will be described. Descriptions of the same configuration and the same processing as those of the first embodiment will be omitted, and the description will be given focusing on differences.

Prior Verification

In order to improve the measurement accuracy as described with reference to FIGS. 11A and 11B, the inventors focused on configurations (peripheral members) other than the surroundings of the rolling elements 5 that constitute the bearing device 2. First, in order to verify an effect of the configurations other than the surroundings of the rolling elements 5, a test bearing device capable of ignoring effects of $C_1$—, $C_2$, and $C_3$ including the rolling elements is prepared and tested. Specifically, the plurality of rolling elements provided in the bearing device are implemented by ceramic rolling elements having insulating properties that do not allow an alternating current voltage to pass through. In addition, a bearing device with the seal 6 and a bearing device without the seal 6 are prepared. After the radial load $F_r$ is applied to these bearing devices, measurements are performed using the LCR meter 8.

Figure 12A:
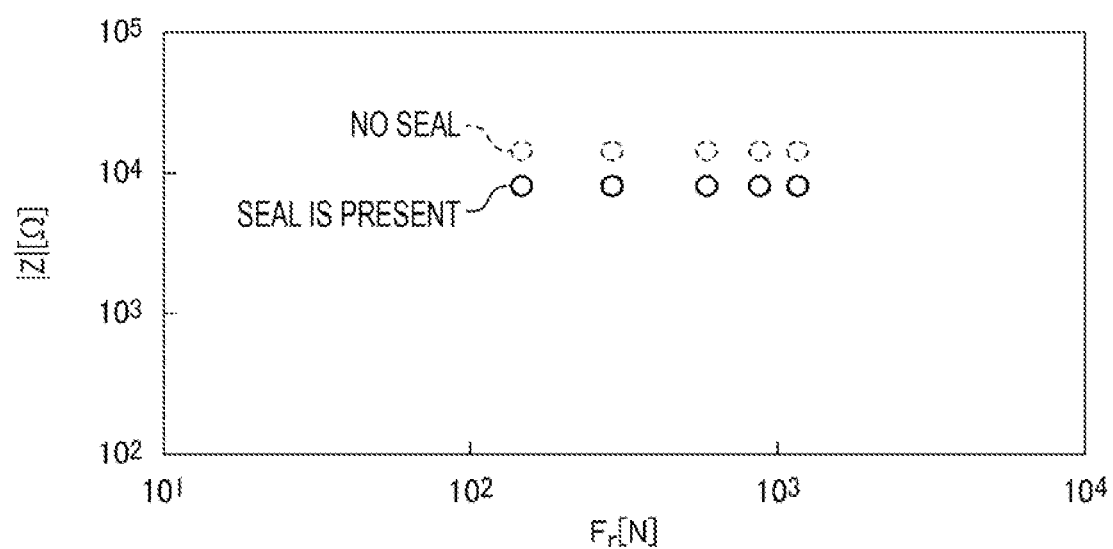
FIG. 12A is a graph for illustrating an effect of a seal according to a second embodiment of the invention of the present application.
Figure 12B:
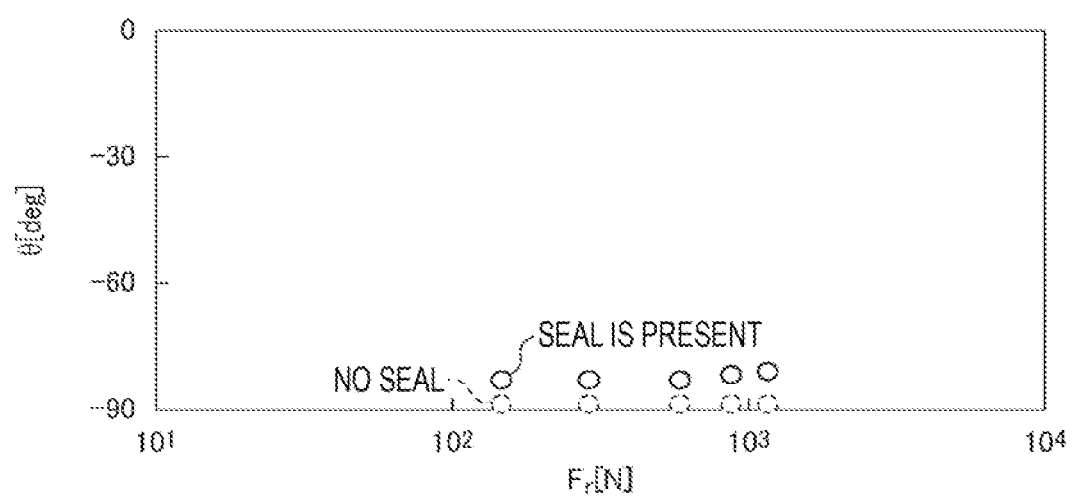
FIG. 12B is a graph for illustrating an effect of the seal according to the second embodiment of the invention of the present application.

FIGS. 12A and 12B show a relation between the radial load $F_r$ and the impedance |Z|, and a relation between the radial load $F_r$ and the phase angle θ, which are obtained from the LCR meter 8, in a test conducted on the test bearing device. In FIG. 12A, a horizontal axis indicates the radial load $F_r$ [N], and a vertical axis indicates the impedance |Z| [Ω]. In FIG. 12B, a horizontal axis indicates the radial load $F_r$ [N], and a vertical axis indicates the phase angle θ.

With reference to FIG. 12A, a difference occurs in the impedance |Z| depending on presence or absence of the seal 6. In this case, since the difference is substantially constant even though the radial load $F_r$ changes, the impedance |Z| does not depend on the radial load $F_r$. In addition, with reference to FIG. 12B, a slight difference occurs in the phase angle θ depending on the presence or absence of the seal 6, and both are approximately −90 degrees. Since no alternating current voltage flows through the ceramic rolling elements, it can be seen that electrostatic capacities are generated between the outer ring 3 and the inner ring 4 and at the seal 6. In the present embodiment, a capacitor formed between the outer ring 3 and the inner ring 4 and at the seal 6 is treated as a capacitor $C_4$ (electrostatic capacity $C_4$).

Equivalent Circuit

Figure 13:
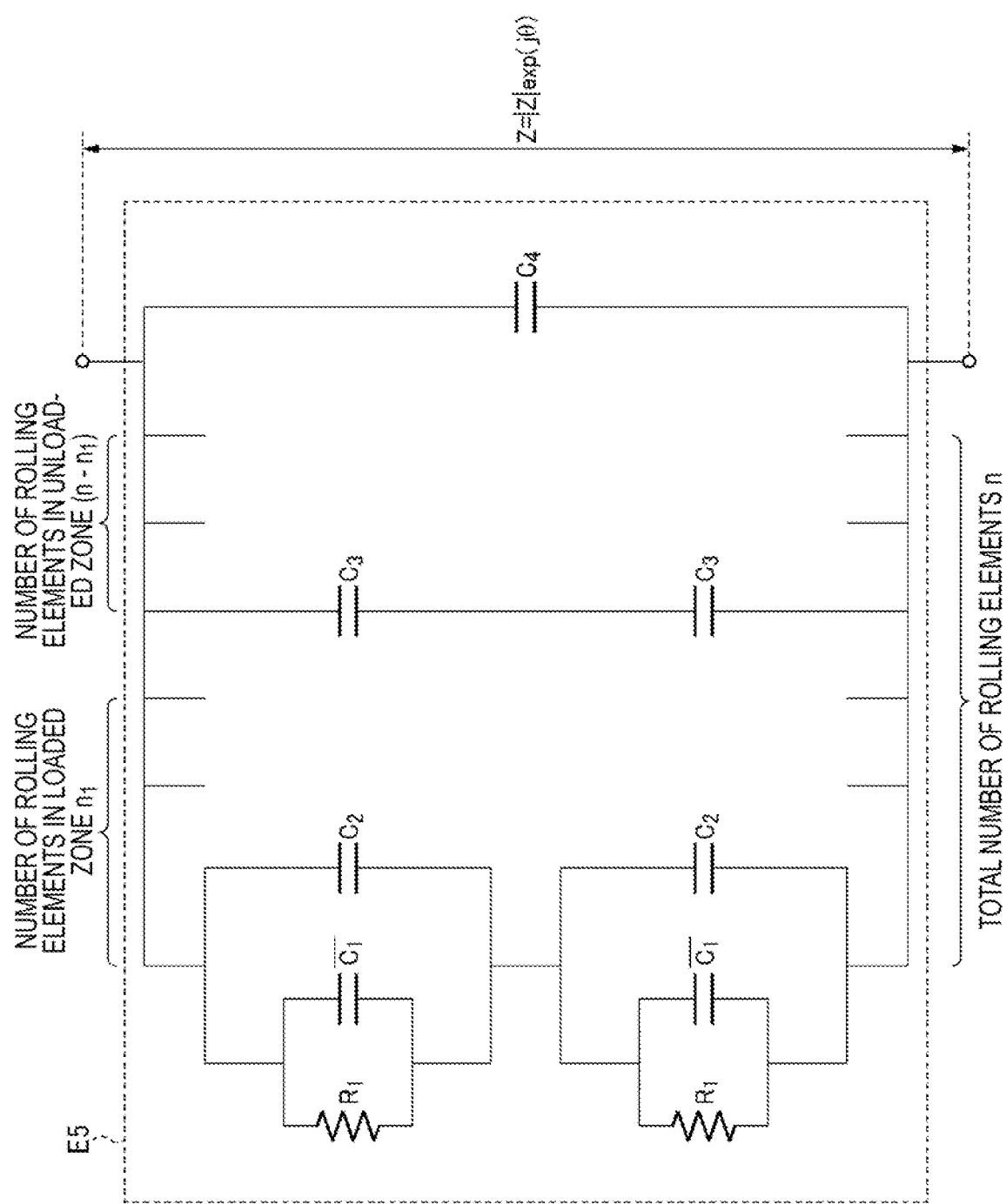
FIG. 13 is a diagram for illustrating an equivalent circuit according to the second embodiment of the invention of the present application.

FIG. 13 is a diagram showing an electrically equivalent circuit E5 in the entire bearing device 2 including the capacitor $C_4$ described above to the equivalent circuit E4 described with reference to FIG. 8 in the first embodiment. The equivalent circuit E5 has a configuration in which the equivalent circuit E4 and the capacitor $C_4$ are connected in parallel. At the time of diagnosis, the alternating current power source is supplied from the LCR meter 8 to the equivalent circuit E5 constituted by the entire bearing device 2 shown in FIG. 13.

Figure 14:
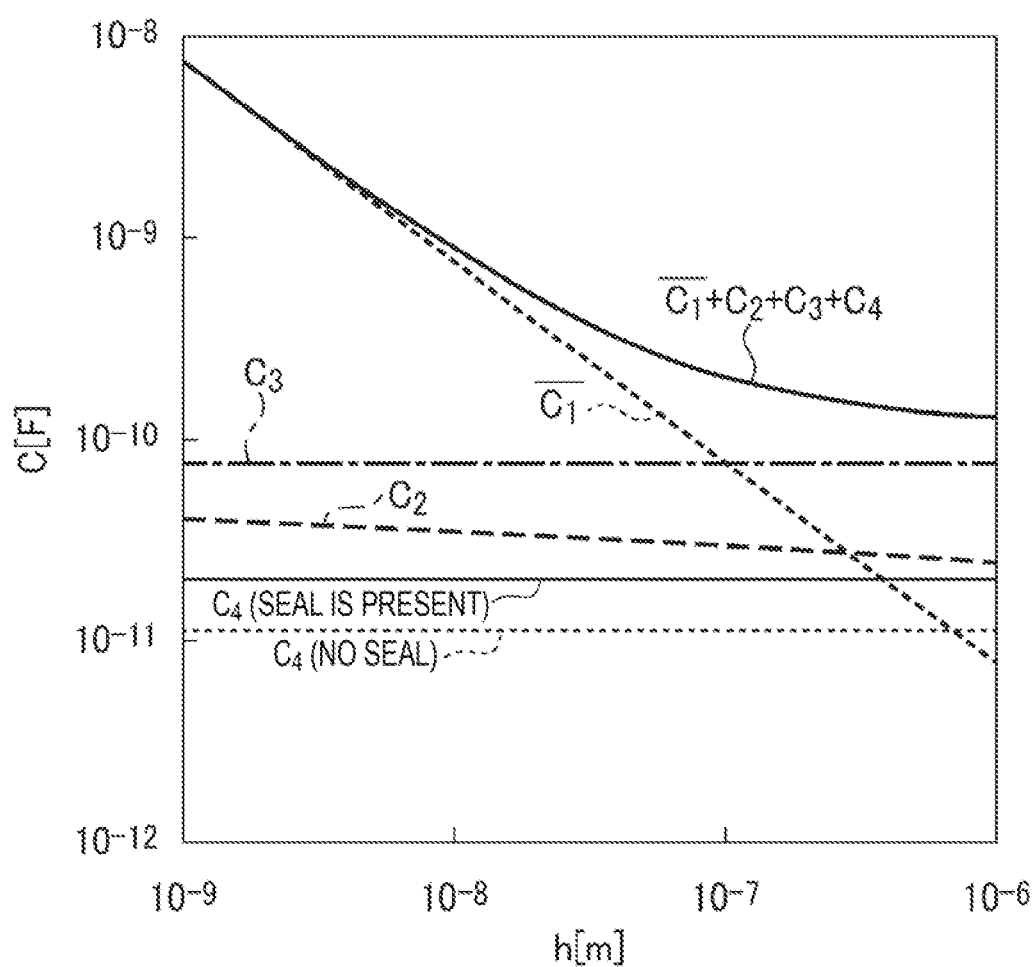
FIG. 14 is a graph for illustrating electrostatic capacities according to the second embodiment of the invention of the present application.

FIG. 14 is a diagram showing relations between the oil film thickness h and electrostatic capacities C of the capacitors $C_1$—, C2, C3, and C4 included in the equivalent circuit shown in FIG. 13. A horizontal axis indicates the oil film thickness h [m], and a vertical axis indicates the electrostatic capacity C [F]. FIG. 14 shows the relation under the following conditions.

Bearing: deep groove ball bearing (model No. 6306)
Number of rolling elements (n): 8
Number of rolling elements positioned in loaded zone ($n_1$): 3
Radial load ($F_r$)=147 [N]

As shown in FIG. 14, the capacitors $C_1$—, $C_2$, and $C_3$ are the same as those shown in FIG. 9. Regarding the capacitor $C_4$, the electrostatic capacity is almost constant regardless of the oil film thickness h, but the electrostatic capacity is higher when the seal 6 is present than that when the seal 6 is not present. In a combination of the capacitors $C_1$—, $C_2$, $C_3$, and $C_4$ (=$C_1$—+$C_2$+$C_3$+$C_4$), an electrostatic capacity decreases as the oil film thickness h increases, but a degree of change becomes gentle as the oil film thickness h increases. Although not shown in FIG. 14, when comparing the combination of the capacitors $C_1$—, $C_2$, $C_3$, and $C_4$(=$C_1$—+$C_2$+$C_3$+$C_4$) and the combination of the capacitors $C_1$—, $C_2$, and $C_3$ (=$C_1$—+$C_2$+$C_3$) shown in FIG. 9, the combination of the capacitors $C_1$—, $C_2$, $C_3$, and $C_4$ (=$C_1$—+$C_2$+$C_3$+$C_4$) has a gentler change (decrease) curve.

Derivation of Oil Film Thickness and Breaking Rate of Oil Film

In the present embodiment, based on the equivalent circuit E5 described with reference to FIG. 13, the following Formula (10) is used to derive the oil film thickness h and the breaking rate α of the oil film of the lubricant under the radial load. That is, Formula (10) takes into account an effect of the capacitor $C_4$ in addition to Formula (9) described above. A value of $C_4$ shown in Formula (10) can be specified in advance according to the configuration of the bearing device 2 as shown in FIG. 14.

[Equation 6]

$$h = (1-\alpha)\delta/\mathfrak{M}\left(\left(\frac{\delta}{r_h}\right)\exp\left(1-\zeta\left(\frac{\sin\theta}{\omega|Z|} + \frac{k}{l}\sum_{m=1}^{n-n_1} C_3(m) + C_4\right)\right)\right) \quad (10)$$

$$\alpha = |Z_0|\cos\theta/|Z|\cos\theta_0$$

$C_4$: electrostatic capacity generated between outer ring and inner ring and between seal and inner ring

Test

Results of tests conducted based on the diagnostic method described above will be described. The configuration at the time of testing and test conditions are the same as the configuration shown in the first embodiment.

Figure 15A:
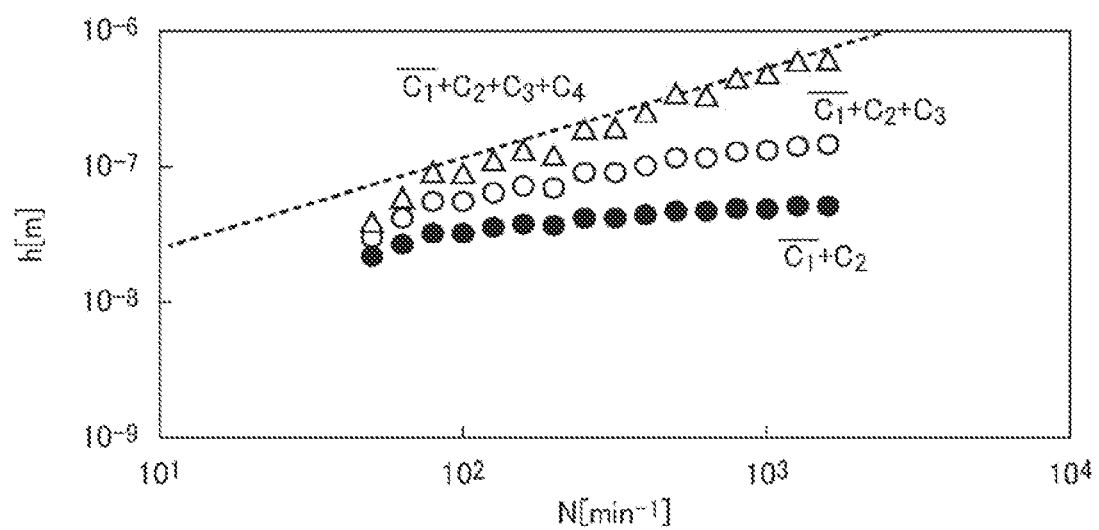
FIG. 15A is a graph showing a measurement result according to the second embodiment of the invention of the present application.
Figure 15B:
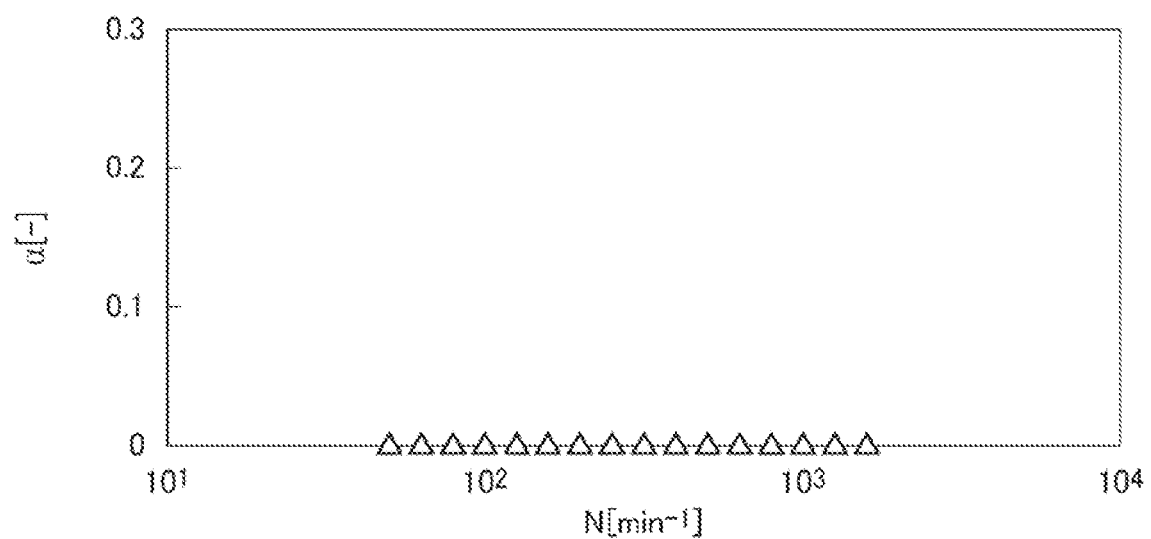
FIG. 15B is a graph showing a measurement result according to the second embodiment of the invention of the present application.

FIGS. 15A and 15B are diagrams showing a relation between the rotational speed N and the oil film thickness h and a relation between the rotational speed N and the breaking rate α which are obtained from the results of the test conducted under the above test conditions. In FIG. 15A, a horizontal axis indicates the rotational speed N [$\min^{-1}$], and a vertical axis indicates the oil film thickness h [m]. In FIG. 15B, a horizontal axis indicates the rotational speed N [$\min^{-1}$], and a vertical axis indicates the breaking rate α. As shown in the test conditions described above, the results are plotted for the rotational speed in the range of 50 [$\min^{-1}$] to 1581 [$\min^{-1}$].

In FIG. 15A, a dashed line, "•", and "○" are the same as those in FIG. 11. "Δ" indicates a result of deriving the oil film thickness h by using Formula (10). That is, "Δ" is a derivation result in consideration of the capacitor $C_4$. As shown in FIG. 15A, the result indicated by "Δ" is closer to the theoretical value than the result indicated by "•" or "○" at any rotational speed, making it possible to derive the oil film thickness h with higher accuracy. As shown in FIG. 15B, the breaking rate α can be derived together with the oil film thickness h at any rotational speed.

Next, a detection accuracy of the oil film thickness according to the present embodiment will be described. In order to specify the oil film thicknesses h and the breaking rates α in the loaded zone and the unloaded zone according to the present embodiment, the inventors prepare, as a test bearing device, a bearing device including one steel rolling element and other ceramic rolling elements in the plurality of rolling elements. The steel rolling element functions as a conductor, and the current from the alternating current power source flows through the steel rolling element. On the other hand, the ceramic rolling elements function as insulators, and the current from the alternating current power source does not flow through the ceramic rolling element. When the radial load and the alternating current voltage are applied to the steel rolling element in the bearing device having this configuration, the effect of the capacitor $C_3$ (that is, the electrostatic capacity $C_3$ in the unloaded zone) described in the first embodiment can be ignored.

A test is conducted under the following conditions by using the test bearing device described above.

Test Condition

Bearing: deep groove ball bearing (model No. 6306, and configuration of rolling element is as described above)
Radial load ($F_r$)=147 [N]
Rotational speed: 50 [$\min^{-1}$]
Lubricant: urea grease
Kinematic viscosity: 74 [$mm^2/s$, 40° C.]

Figure 16A:
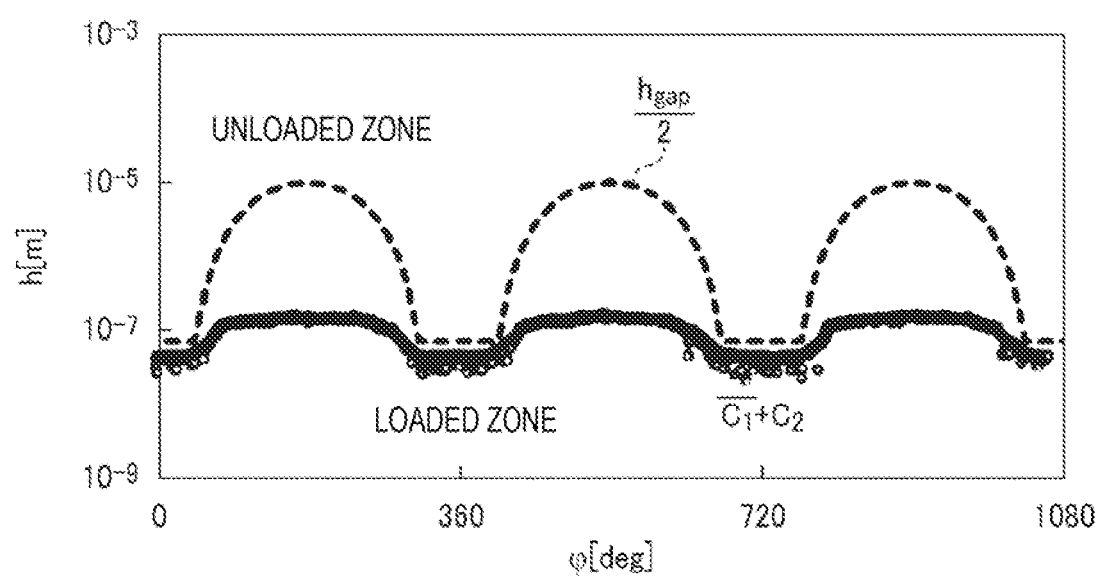
FIG. 16A is a graph for illustrating a measurement accuracy according to the second embodiment of the invention of the present application.
Figure 16B:
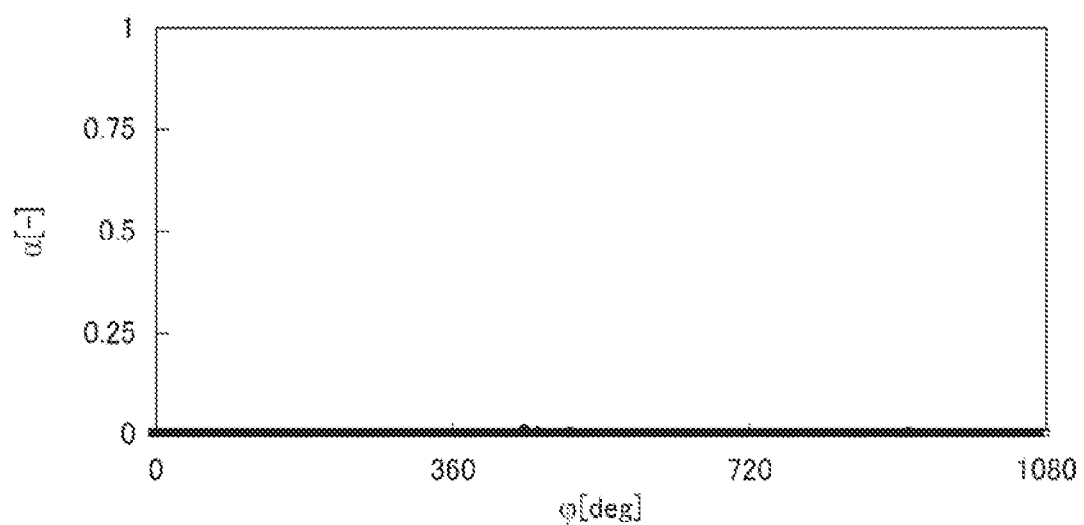
FIG. 16B is a graph for illustrating a measurement accuracy according to the second embodiment of the invention of the present application.
Figure 17A:
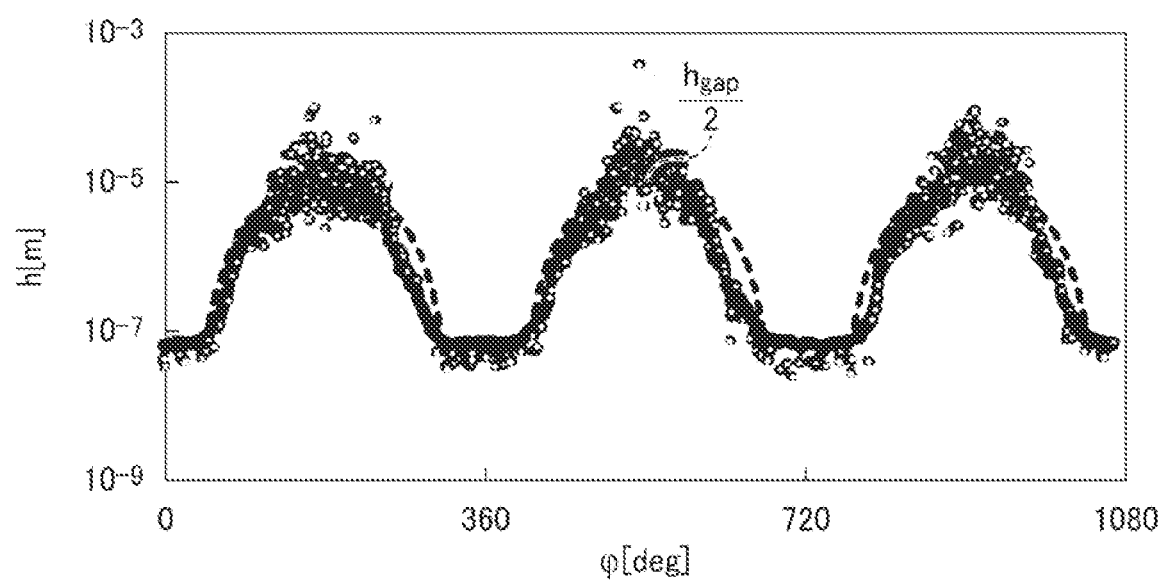
FIG. 17A is a graph for illustrating a measurement accuracy according to the second embodiment of the invention of the present application.
Figure 17B:
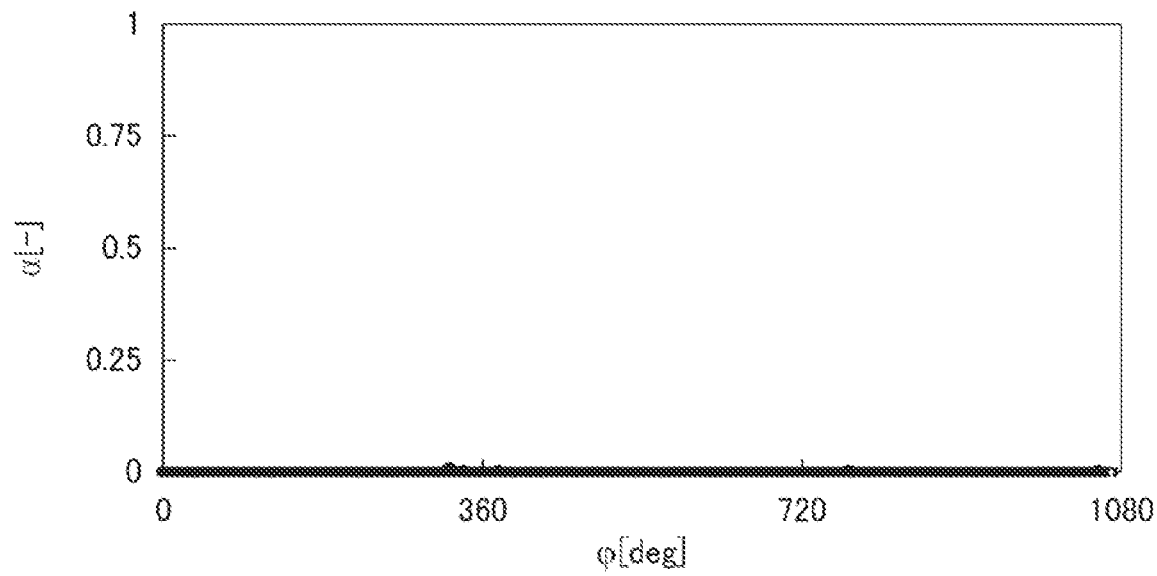
FIG. 17B is a graph for illustrating a measurement accuracy according to the second embodiment of the invention of the present application.

FIGS. 16A, 16B, 17A, and 17B are diagrams showing a relation between a position φ and the oil film thickness h and a relation between the position φ and the breaking rate α which are obtained from the results of the test conducted under the above test conditions. In FIGS. 16A and 16B, the oil film thickness h and the breaking rate α are plotted based on the results calculated by Formula (8) which is a method used in the related art. In FIGS. 17A and 17B, the oil film thickness h and the breaking rate α are plotted based on the results calculated by Formula (10) according to the present embodiment. In each of FIGS. 16A and 17A, a horizontal axis indicates the position φ [deg], and a vertical axis indicates the oil film thickness h [m]. In each of FIGS. 16B and 17B, a horizontal axis indicates the position φ [deg], and a vertical axis indicates the breaking rate α. The position α here takes a positive value counterclockwise along a rotation direction of the inner ring 4 (or outer ring 3) with a position (center position of loaded zone) in a direction in which the radial load $F_r$ is applied, as a reference (φ=0). In the example of FIGS. 16A and 16B, the position φ ranges from 0 to 1080, which is positioned in a range of 3 circumferences of the bearing device. In addition, the periphery of positions of q=0, 360, 720, and 1080 corresponds to the loaded zone, and the other ranges are the unloaded zone.

In each of FIGS. 16A and 17A, a dashed line indicates a theoretical value of h, and a peak portion corresponds to a gap (h=$h_{gap}/2$) between the rolling element 5 and the outer ring 3 (or inner ring 4) located in the center of the unloaded zone (see FIG. 6). With reference to FIG. 16A, the oil film thickness h can be measured at a value close to the theoretical value in the loaded zone, but the oil film thickness h cannot be measured accurately in the unloaded zone. That is, as shown in FIG. 16A, in a method in the related art, the oil film thickness h is detected to be low also in the unloaded zone, and the result is significantly different from the theoretical value. With reference to FIG. 16B, the breaking rate α can be measured at any position φ. On the other hand, with reference to FIG. 17A, the oil film thickness h can be measured at a value close to the theoretical value in both the loaded zone and the unloaded zone. With reference to FIG. 17B, the breaking rate α can be measured at any position φ.

In the present embodiment, the seal 6 is described as an example of the peripheral member that constitutes the bearing device 2. However, the capacitor $C_4$ (electrostatic capacity of $C_4$ in Formula (10)) may be set in consideration of other peripheral members that constitute the bearing device 2. As shown in FIG. 14, the configuration may be such that the value of $C_4$ in Formula (10) is adjusted according to the presence or absence of the seal 6.

As described above, according to the present embodiment, further than the first embodiment, the measurement accuracy can be improved while the oil film thickness inside the bearing device and the contact ratio between parts are simultaneously detected under the radial load. The oil film thickness and the contact ratio can be accurately measured in both the loaded zone and the unloaded zone under the radial load.

Formula (10) used in the present embodiment is constructed based on Formula (8) in consideration of the axial load, and thus Formula (10) is applicable even under the axial load. Therefore, Formula (10) can be used universally under both axial load and radial load conditions.

OTHER EMBODIMENTS

In the invention of the present application, computer programs and applications for implementing the functions of one or more embodiments described above can be supplied to a system or a device by using a network, a storage medium, or the like, and one or more processors in the system or a computer of the device can read and execute the computer programs to implement the functions.

Further, the functions may be implemented by a circuit (for example, an application specific integrated circuit (ASIC) or a field programmable gate array (FPGA)) that implements one or more functions.

As described above, the present invention is not limited to the embodiments described above, and combinations of the respective configurations of the embodiments and modifications and applications by those skilled in the art based on the description of the specification and well-known techniques are also intended by the present invention and are included in the scope of the protection.

As described above, the following matters are disclosed in the present description.

(1) A detection method for detecting a state of a bearing device including an outer member, an inner member, and a plurality of rolling elements, the detection method including:
applying an alternating current voltage to an electric circuit including the outer member, the rolling element, and the inner member while a predetermined load is applied to the bearing device;
measuring an impedance and a phase angle of the electric circuit applied with the alternating current voltage; and
deriving an oil film thickness and a metal contact ratio between the outer member and the plurality of rolling elements or between the inner member and at least one of the plurality of rolling elements based on the impedance and the phase angle.

According to the configuration, the oil film thickness inside the bearing device and the metal contact ratio between parts can be simultaneously detected in consideration of a load direction.

(2) The detection method according to (1), in which
the predetermined load includes at least a radial load, and
the oil film thickness and the metal contact ratio are derived by using a first calculation formula corresponding to an electric circuit configured in each of a loaded zone and an unloaded zone in the bearing device specified by the predetermined load.

According to the configuration, a measurement accuracy can be improved while the oil film thickness inside the bearing device and the metal contact ratio between parts can be simultaneously detected in consideration of the radial load.

(3) The detection method according to (2), in which
the first calculation formula for deriving the oil film thickness h and the metal contact ratio α is as follows.

[Equation 7]

$$h = (1-\alpha)\delta/\mathfrak{B}\left(\left(\frac{\delta}{r_h}\right)\exp\left(1-\zeta\left(\frac{\sin\theta}{\omega|Z|} + \frac{k}{l}\sum_{m=1}^{n-n_1} C_3(m)\right)\right)\right)$$

$$\alpha = |Z_0|\cos\theta/|Z|\cos\theta_0$$

According to the configuration, the measurement accuracy can be improved while the oil film thickness inside the bearing device and the metal contact ratio between parts can be simultaneously detected in consideration of the radial load. In particular, it is possible to detect the oil film thickness inside the bearing device and the metal contact ratio between parts in consideration of electrostatic capacities corresponding to the loaded zone and unloaded zone of the rolling bearing.

(4) The detection method according to (1), in which
the bearing device further includes a peripheral member,
the predetermined load includes at least a radial load, and
the oil film thickness and the metal contact ratio are derived by using a second calculation formula corresponding to an electric circuit configured in each of a loaded zone and an unloaded zone in the bearing device specified by the predetermined load and an electric circuit including the peripheral member.

According to the configuration, the measurement accuracy can be improved while the oil film thickness inside the bearing device and the metal contact ratio between parts can be simultaneously detected in consideration of the radial load and an axial load.

(5) The detection method according to (4), in which
the second calculation formula for deriving the oil film thickness h and the metal contact ratio α is as follows.

[Equation 8]

$$h = (1-\alpha)\delta/\mathfrak{M}\left(\left(\frac{\delta}{r_h}\right)\exp\left(1-\zeta\left(\frac{\sin\theta}{\omega|Z|} + \frac{k}{l}\sum_{m=1}^{n-n_1} C_3(m) + C_4\right)\right)\right)$$

$$\alpha = |Z_0|\cos\theta/|Z|\cos\theta_0$$

According to the configuration, the measurement accuracy can be improved while the oil film thickness inside the bearing device and the contact ratio between parts can be simultaneously detected in consideration of the radial load and the axial load. In particular, it is possible to detect the oil film thickness inside the bearing device and the metal contact ratio between parts in consideration of an electrostatic capacity corresponding to a member of the rolling bearing.

(6) The detection method according to (4) or (5), in which the peripheral member is a seal.

According to the configuration, the oil film thickness and the metal contact ratio can be detected in consideration of an effect of the seal.

(7) The detection method according to any one of (1) to (6), in which the bearing device is further diagnosed by using the oil film thickness and the metal contact ratio.

According to the configuration, a state related to a lubricant of the rolling bearing can be diagnosed based on the oil film thickness and the metal contact ratio which are specified according to the load.

(8) A detection device for detecting a state of a bearing device including an outer member, an inner member, and a plurality of rolling elements, the detection device including:

an acquisition unit configured to, when an alternating current voltage is applied to an electric circuit including the outer member, the rolling element, and the inner member while a predetermined load is applied to the bearing device, acquire an impedance and a phase angle of the electric circuit applied with the alternating current voltage; and a derivation unit configured to derive an oil film thickness and a metal contact ratio between the outer member and the plurality of rolling elements or between the inner member and at least one of the plurality of rolling elements based on the impedance and the phase angle.

According to the configuration, the oil film thickness inside the bearing device and the metal contact ratio between parts can be simultaneously detected in consideration of the load direction.

(9) A non-transitory computer-readable storage medium storing a computer program for making a computer function as:

an acquisition unit configured to, in a state of applying a predetermined load to a bearing device including an outer member, an inner member, and a plurality of rolling elements, when an alternating current voltage is applied to an electric circuit including the outer member, the rolling element, and the inner member, acquire an impedance and a phase angle of the electric circuit applied with the alternating current voltage; and a derivation unit configured to derive an oil film thickness and a metal contact ratio between the inner outer member and the plurality of rolling elements or between the inner member and at least one of the plurality of rolling elements based on the impedance and the phase angle.

According to the configuration, the oil film thickness inside the bearing device and the metal contact ratio between parts can be simultaneously detected in consideration of the load direction.

Although the embodiments are described above with reference to the drawings, it is needless to say that the present invention is not limited to such examples. It will be apparent to those skilled in the art that various changes and modifications may be conceived within the scope of the claims, and it is also understood that the various changes and modifications belong to the technical scope of the present invention. Components in the embodiments described above may be combined freely within a range not departing from the spirit of the present invention.

REFERENCE SIGNS LIST

1: diagnostic device
2: bearing device
3: outer ring (outer member)
4: inner ring (inner member)
5: rolling element
6: seal
7: rotary shaft
8: LCR meter
9: rotary connector
10: motor

The invention claimed is:

1. A detection method for detecting a state of a bearing device including an outer member, an inner member, and a plurality of rolling elements, the detection method comprising:

applying an alternating current voltage to an electric circuit including the outer member, the rolling element, and the inner member while a predetermined load is applied to the bearing device;

measuring an impedance and a phase angle of the electric circuit applied with the alternating current voltage; and deriving an oil film thickness and a metal contact ratio between the outer member and the plurality of rolling elements or between the inner member and at least one of the plurality of rolling elements based on the impedance and the phase angle, wherein the predetermined load includes at least a radial load, and wherein the oil film thickness and the metal contact ratio are derived by using a first calculation formula corresponding to an electric circuit configured in each of a loaded zone and an unloaded zone in the bearing device specified by the predetermined load.

2. The detection method according to claim 1, wherein the first calculation formula for deriving the oil film thickness h and the metal contact ratio $\alpha$ is as follows.

[Equation 1]

$$h = (1-\alpha)\delta/\mathfrak{M}\left(\left(\frac{\delta}{r_h}\right)\exp\left(1-\zeta\left(\frac{\sin\theta}{\omega|Z|} + \frac{k}{l}\sum_{m=1}^{n-n_1} C_3(m)\right)\right)\right)$$

$$\alpha = |Z_0|\cos\theta/|Z|\cos\theta_0$$

3. The detection method according to claim 1, wherein the bearing device further includes a peripheral member, the predetermined load includes at least a radial load, and the oil film thickness and the metal contact ratio are derived by using a second calculation formula corresponding to an electric circuit configured in each of a loaded zone and an unloaded zone in the bearing device specified by the predetermined load and an electric circuit including the peripheral member.

4. The detection method according to claim 3, wherein the second calculation formula for deriving the oil film thickness and the metal contact ratio is as follows.

[Equation 2]

$$h = (1-\alpha)\delta/\mathfrak{B}\left(\left(\frac{\delta}{r_h}\right)\exp\left(1-\zeta\left(\frac{\sin\theta}{\omega|Z|} + \frac{k}{l}\sum_{m=1}^{n-n_1} C_3(m) + C_4\right)\right)\right)$$

$$\alpha = |Z_0|\cos\theta/|Z|\cos\theta_0$$

5. The detection method according to claim 3, wherein the peripheral member is a seal.

6. The detection method according to claim 1, wherein the bearing device is further diagnosed by using the oil film thickness and the metal contact ratio.

7. A detection device for detecting a state of a bearing device including an outer member, an inner member, and a plurality of rolling elements, the detection device comprising:
an acquisition unit, implemented by one or more processors, configured to, when an alternating current voltage is applied to an electric circuit including the outer member, the rolling element, and the inner member while a predetermined load is applied to the bearing device, acquire an impedance and a phase angle of the electric circuit applied with the alternating current voltage; and
a derivation unit, implemented by the one or more processors, configured to derive an oil film thickness and a metal contact ratio between the outer member and the plurality of rolling elements or between the inner member and at least one of the plurality of rolling elements based on the impedance and the phase angle,
wherein the predetermined load includes at least a radial load, and
wherein the oil film thickness and the metal contact ratio are derived by using a first calculation formula corresponding to an electric circuit configured in each of a loaded zone and an unloaded zone in the bearing device specified by the predetermined load.

8. A non-transitory computer-readable storage medium storing a computer program for making a computer function as:
an acquisition unit configured to, in a state of applying a predetermined load to a bearing device including an outer member, an inner member, and a plurality of rolling elements, when an alternating current voltage is applied to an electric circuit including the outer member, the rolling element, and the inner member, acquire an impedance and a phase angle of the electric circuit applied with the alternating current voltage; and
a derivation unit configured to derive an oil film thickness and a metal contact ratio between the outer member and the plurality of rolling elements or between the inner member and at least one of the plurality of rolling elements based on the impedance and the phase angle,
wherein the predetermined load includes at least a radial load, and
wherein the oil film thickness and the metal contact ratio are derived by using a first calculation formula corresponding to an electric circuit configured in each of a loaded zone and an unloaded zone in the bearing device specified by the predetermined load.

* * * * *